United States Patent
Gillott et al.

(10) Patent No.: US 11,541,976 B2
(45) Date of Patent: Jan. 3, 2023

(54) DEEP WATER HIGH RESOLUTION OBJECT DETECTION

(71) Applicant: Magseis FF LLC, Houston, TX (US)

(72) Inventors: Graham Gillott, Arona (IT); Terence Hibben, London (GB)

(73) Assignee: Magseis FF LLC, Houston, TX (US)

( * ) Notice: Subject to any disclaimer, the term of this patent is extended or adjusted under 35 U.S.C. 154(b) by 704 days.

(21) Appl. No.: 16/446,411

(22) Filed: Jun. 19, 2019

(65) Prior Publication Data

US 2020/0398957 A1 Dec. 24, 2020

(51) Int. Cl.
*G01S 15/04* (2006.01)
*G01S 15/89* (2006.01)
*G01S 7/539* (2006.01)
*B63C 11/48* (2006.01)

(52) U.S. Cl.
CPC .............. *B63C 11/48* (2013.01); *G01S 7/539* (2013.01); *G01S 15/04* (2013.01); *G01S 15/89* (2013.01)

(58) Field of Classification Search
CPC ..... B63C 11/48; B63C 321/663; G01S 7/539; G01S 15/04; G01S 15/89; G01V 2210/1293; G01V 2210/1423; G01V 1/3808; G01V 1/3861; G01V 1/3817
USPC .......................................................... 73/627
See application file for complete search history.

(56) References Cited

U.S. PATENT DOCUMENTS

| | | | |
|---|---|---|---|
| 3,943,484 A | 3/1976 | Balderson | |
| 5,193,077 A | 3/1993 | Weiglein et al. | |
| 6,882,938 B2 * | 4/2005 | Vaage | G01V 1/364 702/14 |
| 7,433,264 B2 | 10/2008 | Vigen | |
| 7,796,466 B2 * | 9/2010 | Combee | G01V 1/38 367/134 |
| 7,969,152 B2 * | 6/2011 | Velikhov | G01V 3/12 324/345 |
| 8,209,125 B2 | 6/2012 | Berkovitch et al. | |
| 8,347,805 B2 | 1/2013 | Stokkeland et al. | |

(Continued)

FOREIGN PATENT DOCUMENTS

WO WO-2016/190746 A1 12/2016

OTHER PUBLICATIONS

International Search Report and Written Opinion for PCT/US2019/045983 dated Jun. 25, 2020 (18 pages).

(Continued)

*Primary Examiner* — Jacques M Saint Surin
(74) *Attorney, Agent, or Firm* — Sage Patent Group

(57) ABSTRACT

A seabed object detection system is provided. The system can include a receiver array including streamers. The system can include a plurality of receivers coupled with the streamers. The system can include a receiver array cross-cable to couple with the first streamer and to couple with the second streamer. The receiver array cross-cable can be disposed at a first depth of a body of water. The system can include a first diverter and a second diverter coupled with the receiver array cross-cable. The system can include a source array including a first source and a second source. The source array can be coplanar to the receiver array. The system can include a source array cross-cable to couple with the first source and to couple with the second source, the source array cross-cable disposed at a second depth of the body of water.

18 Claims, 8 Drawing Sheets

(56) References Cited

U.S. PATENT DOCUMENTS

| | | | |
|---|---|---|---|
| 10,000,263 B2 * | 6/2018 | Farber | B63G 7/02 |
| 10,042,068 B2 * | 8/2018 | Woodward, Jr. | B63B 25/28 |
| 10,457,365 B2 * | 10/2019 | Farber | B63G 8/001 |
| 2011/0075516 A1 | 3/2011 | Xia et al. | |
| 2013/0155805 A1 | 6/2013 | Tonchia | |
| 2015/0226867 A1 | 8/2015 | Tonchia | |
| 2019/0176936 A1 | 6/2019 | Le Goff | |
| 2022/0107436 A1 | 4/2022 | Ramos Cordova et al. | |

OTHER PUBLICATIONS

Non-Final Office Action for U.S. Appl. No. 16/446,408 dated Aug. 10, 2021 (8 pages).
Sturzu, I. et al.; "Diffraction Imaging Using Specularity Gathers"; Jounral of Seismic Exploration vol. 23, pp. 1-18, 2014; 18 pages.
Rad, P. et al.; "Diffraction Separation Based on the Projected First Fresnel Zone"; Journal of Geophysics and Engineering vol. 15, pp. 2507-2515, 2018; 9 pages.

* cited by examiner

DEEP WATER HIGH RESOLUTION OBJECT DETECTION

BACKGROUND

Seismic or other operations performed on a piece of earth can identify subterranean characteristics or features of the analyzed piece of earth.

SUMMARY

At least one aspect of the present disclosure is directed to a seabed object detection system. The seabed object detection system can include a receiver array. The receiver array can include a first streamer and a second streamer. The seabed object detection system can include a first plurality of receivers coupled with the first streamer. The seabed object detection system can include a second plurality of receivers coupled with the second streamer. The seabed object detection system can include a receiver array cross-cable to couple with the first streamer and to couple with the second streamer. The receiver array cross-cable can be disposed at a first depth of a body of water. The seabed object detection system can include a first diverter coupled with the receiver array cross-cable. The seabed object detection system can include a second diverter coupled with the receiver array cross-cable. The seabed object detection system can include a source array comprising a first source and a second source. The source array can be coplanar to the receiver array. The seabed object detection system can include a source array cross-cable to couple with the first source and to couple with the second source. The source array cross-cable can be disposed at a second depth of the body of water.

At least one aspect of the present disclosure is direct to a method of seabed object detection. The method can include providing a receiver array. The receiver array can include a first streamer and a second streamer. The method can include coupling a first plurality of receivers with the first streamer and a second plurality of receivers with the second streamer. The method can include coupling a receiver array cross-cable with the first streamer and the receiver array cross-cable with the second streamer. The method can include disposing the receiver array cross-cable at a first depth of a body of water. The method can include coupling a first diverter with the receiver array cross-cable and a second diverter with the receiver array cross-cable. The method can include providing a source array. The source array can include a first source and a second source. The source array can be coplanar to the receiver array. The method can include coupling a source array cross-cable with the first source and the source array cross-cable with the second source. The method can include disposing the source array cross-cable at a second depth of the body of water.

At least one aspect of the present disclosure is directed to a seabed object detection system. The seabed object detection system can include a receiver array. The receiver array can include a first streamer. The seabed object detection system can include a first plurality of receivers coupled with the first streamer. The seabed object detection system can include at least one receiver of the first plurality of receivers to receive reflection data reflected off an object in a seabed during a first time period and to receive reflection data reflected off an ocean surface and the object in the seabed during a second time period. The first time period can be separated from the second time period by a first intervening time period. The seabed object detection system can include a receiver array cross-cable to couple with the first streamer. The receiver array cross-cable can be disposed at a first depth of a body of water. The seabed object detection system can include a source array. The source array can include a first source. The seabed object detection system can include a source array cross-cable to couple with the first source. The source array cross-cable can be disposed at a second depth of the body of water.

At least one aspect of the present disclosure is direct to a method of seabed object detection. The method can include providing a receiver array. The receiver array can include a first streamer. The method can include coupling a first plurality of receivers with the first streamer. The method can include receiving, by at least one receiver of the first plurality of receivers, reflection data reflected off an object in a seabed during a first time period and to receive reflection data reflected off an ocean surface and the object in the seabed during a second time period. The first time period can be separated from the second time period by a first intervening time period. The method can include coupling a receiver array cross-cable with the first streamer. The method can include disposing the receiver array cross-cable a first depth of a body of water. The method can include providing a source array. The source array can include a first source. The method can include coupling a source array cross-cable with the first source. The method can include disposing the source array cross-cable at a second depth of the body of water.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Reflection-based surveys as described herein can obtain information relating to subsurface features. An acoustic signal can reflect off subsurface lithological formations and be acquired, analyzed and interpreted. However, reflection-based surveys can cover a narrow area and collect a sparse set of data, both of which are factors that contribute to an increased time required to complete the surveys. Additionally, small shallow objects such as boulders buried in the seabed may be difficult to precisely image due to the resolution capabilities of reflection-based surveys. These small objects can complicate or delay wind turbine, marine or ocean bottom constructions that are fixed to the seabed, as well as the placement of cable connections and communication lines between these wind turbine, marine or ocean bottom constructions.

The present disclosure is directed to systems and methods for seabed object detection. Due to the limitations of reflection-based surveys, it can be challenging to detect small shallow objects in the seabed. Inefficiencies related to increased survey time, such as a greater risk of weather-based delays, can increase the operating cost of these surveys without providing an accurate map of obstacles in the seabed. Additionally, reflection-based surveys can suffer from noise issues that interfere with positioning of receivers and data received by the receivers Systems and methods of the present disclosure can solve these and other problems associated with performing a survey to detect seabed objects.

The present disclosure is directed to systems and methods for seabed object detection. For example, the seabed object detection system can provide an accurate map of obstacles in the seabed. The system can include a receiver array including streamers. The system can include a plurality of receivers coupled with the streamers. The system can include a receiver array cross-cable to couple with the first streamer and to couple with the second streamer. The receiver array cross-cable can be disposed at a first depth of a body of water. The system can include a first diverter and a second diverter coupled with the receiver array cross-cable. The system can include a source array including a first source and a second source. The source array can be coplanar to the receiver array. The system can include a source array cross-cable to couple with the first source and to couple with the second source, the source array cross-cable disposed at a second depth of the body of water.

Figure 1:
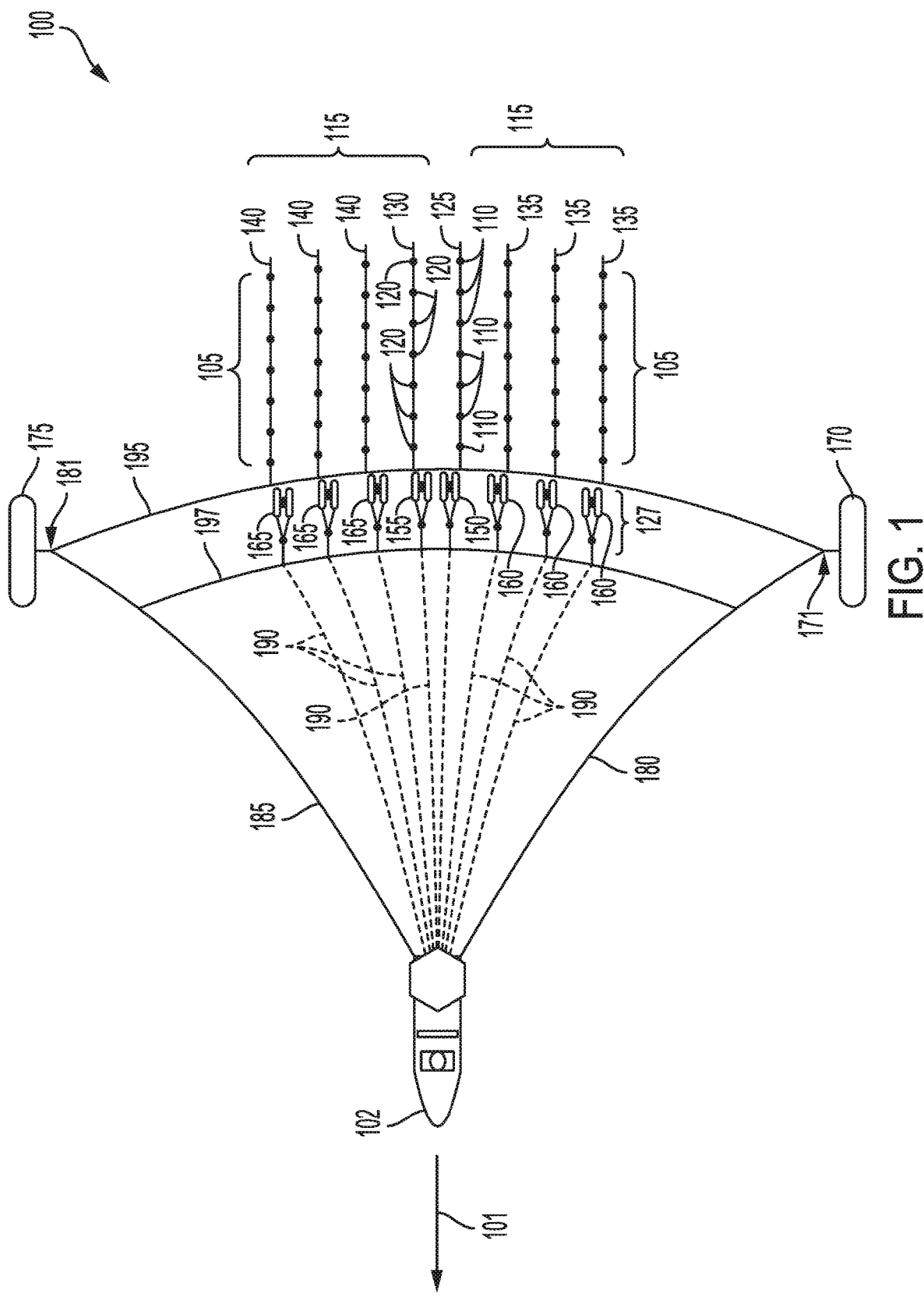
FIG. 1 illustrates a seabed object detection system according to an example implementation.

FIG. 1 illustrates a seabed object detection system 100 illustrative of a marine environment in which the systems and methods of the present disclosure can perform a seismic survey to detect seabed objects. The seabed object detection system 100 can include a receiver array 105. The receiver array 105 can include a first streamer 125. The receiver array 105 can include a second streamer 130. For example, the first streamer 125 may be a cable (e.g., a surface marine cable), an assembly of wires, or any component capable of connecting a receiver to a recording device which may be located on a vessel 102. The first streamer 125 can couple to a receiver array cross-cable 195. For example, the second streamer 130 may be a cable (e.g., a surface marine cable), an assembly of wires, or any component capable of connecting a receiver to a recording device which may be located on a vessel 102. The second streamer 130 can couple to the receiver array cross-cable 195.

The seabed object detection system 100 can include a first plurality of receivers 110. The first plurality of receivers 110 can be coupled with the first streamer 125. The first plurality of receivers 110 can be disposed on the first streamer 125. The first plurality of receivers 110 can be coupled to the first streamer 125 along a line. The first plurality of receivers 110 can be evenly spaced along the first streamer 125. The first plurality of receivers 110 can receive diffraction data diffracted off an object in a seabed. For example, a receiver of the first plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The first plurality of receivers 110 can be configured to detect acoustic waves that are reflected by seabed objects. The first plurality of receivers 110 can be configured to detect acoustic waves that are diffracted by seabed objects. The first plurality of receivers 110 can detect diffraction data from edges of objects. For example, the first plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The first plurality of receivers 110 can detect objects with irregular surface features. For example, the plurality of receivers 110 can detect objects with facets, edges, sharp boundaries, or textures. The seabed objects can be completely buried within the seabed. The seabed objects can be partially buried within the seabed.

The seabed object detection system 100 can include a second plurality of receivers 120. The second plurality of receivers 120 can be coupled with the second streamer 130. The second plurality of receivers 120 can be disposed on the second streamer 130. The second plurality of receivers 120 can be coupled to the second streamer 130 along a line. The second plurality of receivers 120 can be evenly spaced along the second streamer 130. The second plurality of receivers 120 can receive diffraction data diffracted off an object in a seabed. For example, a receiver of the second plurality of receivers 120 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The second plurality of receivers 120 can be configured to detect acoustic waves that are reflected by seabed objects. The second plurality of receivers 120 can be configured to detect acoustic waves that are diffracted by seabed objects. The second plurality of receivers 120 can detect diffraction data from edges of objects. For example, the second plurality of receivers 120 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The second plurality of receivers 120 can detect objects with irregular surface features. For example, second plurality of receivers 120 can detect objects with facets, edges, sharp boundaries, or textures. The seabed objects can be completely buried within the seabed. The seabed objects can be partially buried within the seabed.

The seabed object detection system 100 can include a receiver array cross-cable 195. The receiver array cross-cable 195 can couple with the first streamer 125. For example, the first streamer 125 can be tied to the receiver array cross-cable 195. The receiver array cross-cable 195 can couple with the first streamer 125 at a first end of the first streamer 125. The first streamer 125 can couple to the receiver array cross-cable 195 at multiple connections points. The receiver array cross-cable 195 can couple with the second streamer 130. For example, the second streamer 130 can be tied to the receiver array cross-cable 195. The receiver array cross-cable 195 can couple with the second streamer 130 at a first end of the second streamer 130. The second streamer 130 can couple to the receiver array cross-cable 195 at multiple connections points. The receiver array cross-cable 195 can couple with a source array cross-cable 197. The receiver array cross-cable 195 can couple with a first lateral cable 180. The receiver array cross-cable 195 can couple with the first lateral cable 180 at a first lateral cable distal end 171. The receiver array cross-cable 195 can couple with a first diverter 170. The receiver array cross-cable 195 can couple with a second diverter 175. The receiver array cross-cable 195 can couple with a second lateral cable 185. The receiver array cross-cable 195 can couple with the second lateral cable 185 at a second lateral cable distal end 181. The receiver array cross-cable 195 may be a power cable to transmit electrical power from the vessel 102 to the first plurality of receivers 110. The receiver array cross-cable 195 may be a power cable to transmit electrical power from the vessel 102 to the second plurality of receivers 120. The receiver array cross-cable 195 can be disposed at a first depth of a body of water.

The seabed object detection system 100 can include a first diverter 170. The first diverter 170 can couple with the receiver array cross-cable 195. The first diverter 170 can couple with the first lateral cable 180. The first diverter 170 can couple with the first lateral cable 180 at the first lateral cable distal end 171. The first lateral cable 180 can be coupled with the receiver array cross-cable 195. The first diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The seabed object detection system 100 can include a second diverter 175. The second diverter 175 can couple with the receiver array cross-cable 195. The second diverter 175 can couple with the second lateral cable 185. The second diverter 175 can couple with the second lateral cable 185 at the first lateral cable distal end 171. The second lateral cable 185 can be coupled with the receiver array cross-cable 195. The second diverter 175 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter.

The seabed object detection system 100 can include a source array 127. The source array 127 can include a first source 150. For example, the first source 150 can generate a source shot. The first source 150 can generate acoustic waves. The source array 127 can generate an acoustic signal to be received by the receiver array 105. For example, the source array 127 can include the first source 150 coupled to a source array cross-cable 197. The source array 127 including the first source 150 can include a pattern of sources. The source array 127 can include a second source 155. For example, the second source 155 can generate a source shot. The second source 155 can generate acoustic waves. The source array 127 can generate an acoustic signal to be received by the receiver array 105. For example, the source array 127 can include the second source 155 coupled to the source array cross-cable 197. The source array 127 including the second source 155 can include a pattern of sources. The source array 127 can be coplanar to the receiver array 105. A plane of the source array 127 can be coplanar to a plane of the receiver array 105.

The seabed object detection system 100 can include a source array cross-cable 197. The source array cross-cable 197 can couple with the first source 150. The source array cross-cable 197 can connect with the first source 150. The source array cross-cable 197 can couple with the first source 150 through a secondary cable. The source array cross-cable 197 can couple with the second source 155. The source array cross-cable 197 can connect with the second source 155. The source array cross-cable 197 can couple with the second source 155 through a secondary cable. The source array cross-cable 197 may be a power cable to transmit electrical power from the vessel 102 to the first source 150. The source array cross-cable 197 may be a power cable to transmit electrical power from the vessel 102 to the second source 155. The source array cross-cable 197 can be disposed at a second depth of the body of water.

The seabed object detection system 100 can include a first lateral cable 180 to couple with a first diverter 170. The first lateral cable 180 can couple with the source array cross-cable 197. For example, the first lateral cable 180 may be a cable (e.g., a surface marine cable), an assembly of wires, a tether, or a rope. The first lateral cable 180 can connect with the source array cross-cable 197. The first lateral cable 180 can couple with the receiver array cross-cable 195. The receiver array cross-cable 195 can couple with the first diverter 170. The first lateral cable 180 can couple directly to the first diverter 170. The first lateral cable 180 can couple to the first diverter 170 through a secondary cable. The first lateral cable 180 can be coupled with the receiver array cross-cable 195 to connect with the first diverter 170. The first lateral cable 180 can be coupled with the receiver array cross-cable 195 to connect with the first diverter 170 at the first lateral cable distal end 171. The first lateral cable 180 may be a power cable to transmit electrical power from the vessel 102 to the first source 150. The first lateral cable 180 may be a power cable to transmit electrical power from the vessel 102 to the second source 155. The first lateral cable 180 may be a power cable to transmit electrical power from the vessel 102 to the first plurality of receivers 110. The first lateral cable 180 may be a power cable to transmit electrical power from the vessel 102 to the second plurality of receivers 120.

The seabed object detection system 100 can include a second lateral cable 185 to couple with a second diverter 175. The second lateral cable 185 can couple with the source array cross-cable 197. For example, the second lateral cable 185 may be a cable (e.g., a surface marine cable), an assembly of wires, a tether, or a rope. The second lateral cable 185 can connect with the source array cross-cable 197. The second lateral cable 185 can couple with the receiver array cross-cable 195. The receiver array cross-cable 195 can couple with the second diverter 175. The second lateral cable 185 can couple directly to the second diverter 175. The second lateral cable 185 can couple to the second diverter 175 through a secondary cable. The second lateral cable 185 can be coupled with the receiver array cross-cable 195 to connect with the second diverter 175. The second lateral cable 185 can be coupled with the receiver array cross-cable 195 to connect with the second diverter 175 at the second lateral cable distal end 181. The second lateral cable 185 may be a power cable to transmit electrical power from the vessel 102 to the first source 150. The second lateral cable 185 may be a power cable to transmit electrical power from the vessel 102 to the second source 155. The second lateral cable 185 may be a power cable to transmit electrical power from the vessel 102 to the first plurality of receivers 110. The second lateral cable 185 may be a power cable to transmit electrical power from the vessel 102 to the second plurality of receivers 120.

The seabed object detection system 100 can include a vessel 102. The vessel 102 can tow the receiver array 105. The vessel 102 can tow the source array 127. The vessel 102 can tow the source array 127 in a tow direction 101. The vessel 102 can tow the receiver array 105 in a tow direction 101. The vessel can tow the source array cross-cable 197 ahead of the receiver array cross-cable 195 relative to the tow direction 101. For example, the vessel 102 can tow the source array cross-cable 197 in the tow direction 101. The vessel 102 can tow the receiver array cross-cable 195 in the tow direction 101. A portion of the source array cross-cable 197 can be ahead of a portion of the receiver array cross-cable 195 relative to the tow direction 101. The vessel 102 can be coupled to the first lateral cable 180. The vessel 102 can be coupled to the second lateral cable 185.

The seabed object detection system 100 can include a third streamer 135. The third streamer 135 can be located a first distance from the first streamer 125. The third streamer 135 can be located a first distance from the second streamer 130. The first distance can include distances between 5 meters and 30 meters. For example, the first distance can be 12.5 meters. The first distance can be greater than 12.5 meters. The first distance can be less than 12.5 meters. The third streamer 135 may be a cable (e.g., a surface marine cable), an assembly of wires, or any component capable of connecting a receiver to a recording device which may be located on the vessel 102. The receiver array 105 can include the third streamer 135. The receiver array 105 can include multiple third streamers 135. For example, the receiver array 105 can include one, two, three, or more third streamers 135.

The seabed object detection system 100 can include a fourth streamer 140. The fourth streamer 140 can be located a first distance from the first streamer 125. The fourth streamer 140 can be located a first distance from the second streamer 130. The first distance can include distances between 5 meters and 30 meters. For example, the first distance can be 12.5 meters. The first distance can be greater than 12.5 meters. The first distance can be less than 12.5 meters. The fourth streamer 140 may be a cable (e.g., a surface marine cable), an assembly of wires, or any component capable of connecting a receiver to a recording device which may be located on the vessel 102. The receiver array 105 can include the fourth streamer 140. The receiver array 105 can include multiple fourth streamers 140. For example, the receiver array 105 can include one, two, three, or more fourth streamers 140.

The seabed object detection system 100 can include a third source 160. The source array 127 can include a third source 160. The third source 160 can be located between the first streamer 125 and the third streamer 135. The third source 160 can be located between a first third streamer 135 and a second third streamer 135. The third source 160 can generate acoustic waves to be reflected off a seabed object and received by the first plurality of receivers 110. The third source 160 can generate acoustic waves to be diffracted off a seabed object and received by the first plurality of receivers 110. The source array 127 can include multiple third sources 160. For example, the source array 127 can include one, two, three, or more third sources 160. The third source 160 can generate acoustic waves to be reflected off a seabed object and received by the second plurality of receivers 120. The third source 160 can generate acoustic waves to be diffracted off a seabed object and received by the second plurality of receivers 120.

The seabed object detection system 100 can include a fourth source 165. The source array 127 can include a fourth source 165. The fourth source 165 can be located between the second streamer 130 and the fourth streamer 140. The fourth source 165 can be located between a first fourth streamer 140 and a second fourth streamer 140. The fourth source 165 can generate acoustic waves to be reflected off a seabed object and received by the first plurality of receivers 110. The fourth source 165 can generate acoustic waves to be diffracted off a seabed object and received by the first plurality of receivers 110. The source array 127 can include multiple fourth sources 165. For example, the source array 127 can include one, two, three, or more fourth sources 165. The fourth source 165 can generate acoustic waves to be reflected off a seabed object and received by the second plurality of receivers 120. The fourth source 165 can generate acoustic waves to be diffracted off a seabed object and received by the second plurality of receivers 120.

The seabed object detection system 100 can include a plurality of streamers 115. The plurality of streamers 115 can include the first streamer 125. The plurality of streamers 115 can include the second streamer 130. The plurality of streamers 115 can include one or more third streamers 135. For example, the plurality of streamers 115 can include three third streamers 135. The plurality of streamers 115 can include one or more fourth streamers 140. For example, the plurality of streamers 115 can include three fourth streamers 140. The plurality of streamers 115 can include exactly eight streamers. A plurality of receivers can be disposed on the third streamer 135. A plurality of receivers can be disposed on the fourth streamer 140.

The seabed object detection system 100 can include a plurality of sources. The plurality of sources can include the first source 150. The plurality of sources can include the second source 155. The plurality of sources can include one or more third sources 160. For example, the plurality of sources can include three third sources 160. The plurality of sources can include one or more fourth sources 165. For example, the plurality of sources can include three fourth sources 165. The plurality of sources can include exactly eight sources. The plurality of sources can generate an acoustic signal. The first plurality of receivers 110 can receive reflection data reflection off an object in the seabed. The second plurality of receivers 120 can receive reflection data reflected off an object in the seabed 220. The first source 150 can generate an acoustic signal. The first plurality of receivers 110 can receive reflection data reflection off an object in the seabed 220 and generated by the first source 150. The second plurality of receivers 120 can receive reflection data reflected off an object in the seabed and generated by the first source 150. The second source 155 can generate an acoustic signal. The first plurality of receivers 110 can receive reflection data reflection off an object in the seabed and generated by the second source 155. The second plurality of receivers 120 can receive reflection data reflected off an object in the seabed and generated by the second source 155.

The seabed object detection system 100 can include a power cable 190 to provide power to the first source 150. For example, the power cable 190 may be a power cable to transmit electrical power from the vessel 102 to the first source 150. The power cable 190 may be a power cable to transmit electrical power from the source array cross-cable 197 to the first source 150. The power cable 190 may be multiple power cables. The seabed object detection system 100 can include a power cable 190 to provide power to the second source 155. For example, the power cable 190 may be a power cable to transmit electrical power from the vessel 102 to the second source 155. The power cable 190 may be a power cable to transmit electrical power from the source array cross-cable 197 to the second source 155.

The seabed object detection system 100 can include a power cable 190 to provide power to the third source 160. For example, the power cable 190 may be a power cable to transmit electrical power from the vessel 102 to the third source 160. The power cable 190 may be a power cable to transmit electrical power from the source array cross-cable 197 to the third source 160. The power cable 190 may be multiple power cables. The seabed object detection system 100 can include a power cable 190 to provide power to the fourth source 165. For example, the power cable 190 may be a power cable to transmit electrical power from the vessel 102 to the fourth source 165. The power cable 190 may be a power cable to transmit electrical power from the source array cross-cable 197 to the fourth source 165.

Figure 2:
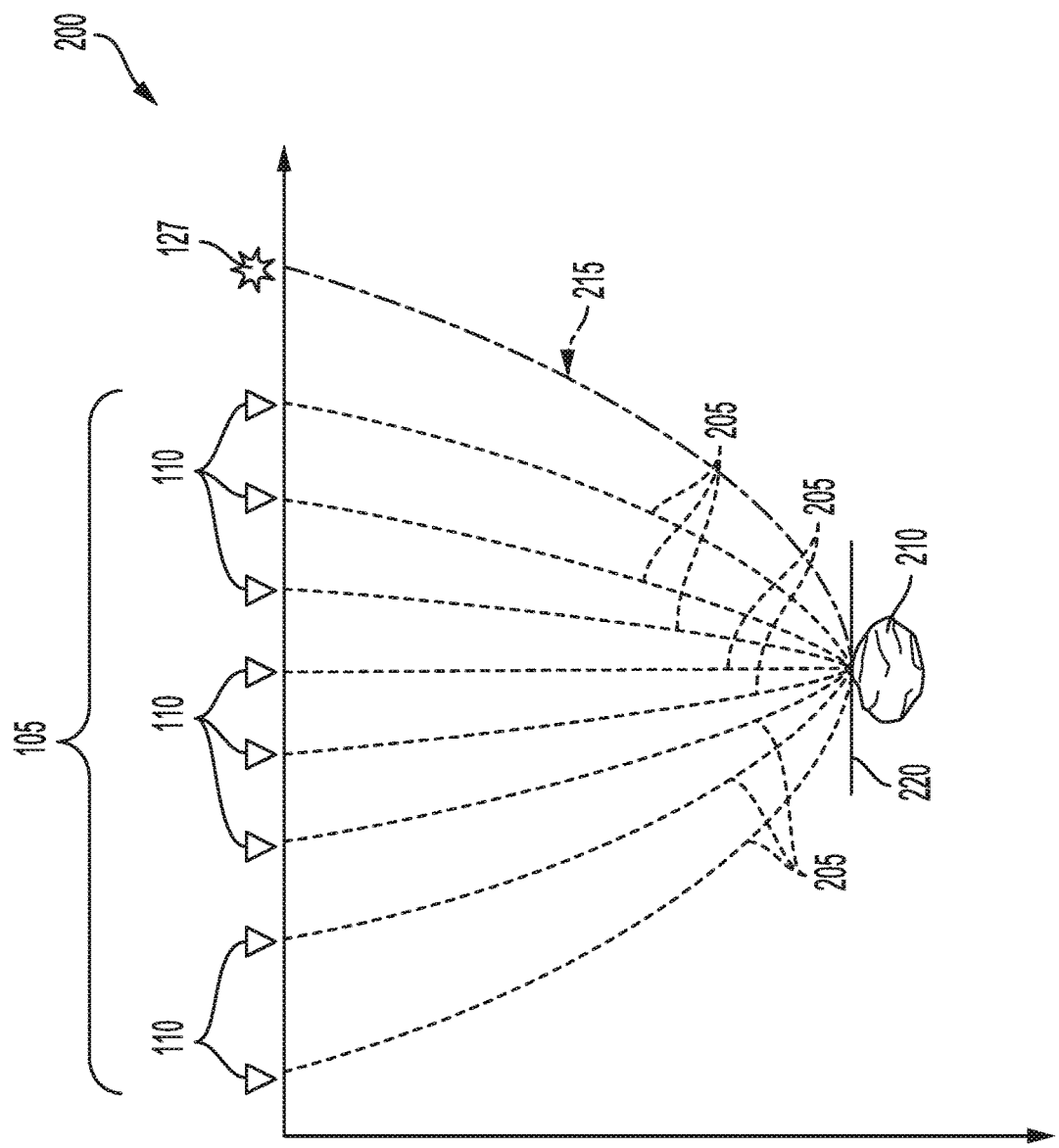
FIG. 2 illustrates a diffraction survey according to an example implementation.

FIG. 2 illustrates a diffraction survey 200. The diffraction survey 200 can include a receiver array 105 and a source array 127. The source array 127 can generate a source shot 215. The source shot 215 can travel through a medium (e.g., sea water) and diffract off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that diffract off the seabed object 210 may include diffraction data. The diffraction data may include diffracted waves 205. The receiver array 105 can receive diffraction data. For example, the receiver array 105 can receive the diffracted waves 205. The first plurality of receivers 110 of the receiver array 105 can receive diffraction data. For example, the first plurality of receivers 110 can receive the diffracted waves 205. A receiver of the first plurality of receivers 110 can receive the diffracted waves 205. The diffraction data can include diffracted waves 205 originating from a seabed object. The diffraction data can include diffracted waves 205 generated from a source shot 215. The second plurality of receivers 120 of the receiver array 105 can receive diffraction data. For example, the second plurality of receivers 120 can receive the diffracted waves 205. A receiver of the second plurality of receivers 120 can receive the diffracted waves 205. The diffraction data can include diffracted waves 205 originating from a seabed object. The diffraction data can include diffracted waves 205 generated from a source shot 215. The first plurality of receivers 110 can detect diffraction data from edges of objects. For example, the first plurality of receivers 110 can detect diffraction data originating from edges of large objects. The second plurality of receivers 120 can detect diffraction data from edges of objects. For example, the second plurality of receivers 120 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The first plurality of receivers 110 can detect objects with irregular surface features. For example, the first plurality of receivers 110 can detect objects with facets, edges, sharp boundaries, or textures. The second plurality of receivers 120 can detect objects with irregular surface features. For example, the second plurality of receivers 120 can detect objects with facets, edges, sharp boundaries, or textures.

The first plurality of receivers 110 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the first plurality of receivers 110 of the receiver array 105 can detect diffracted waves from an object smaller than the Fresnel zone.

The second plurality of receivers 120 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the second plurality of receivers 120 of the receiver array 105 can detect diffracted waves from an object smaller than the Fresnel zone.

The source array 127 can generate acoustic waves. The acoustic waves can include a source shot 215. The acoustic waves can diffract off the object in the seabed. The receiver array 105 can receive diffracted waves originating from the object in the seabed. The central pair of sources can generate acoustic waves. The first source 150 can generate acoustic waves. The second source 155 can generate acoustic waves. A receiver of the first plurality of receivers 110 of the receiver array 105 can receive the diffracted waves. A receiver disposed on the first streamer 125 can receive the diffracted waves. A receiver disposed on the second streamer 130 can receive the diffracted waves. A receiver of the second plurality of receivers 120 of the receiver array 105 can receive the diffracted waves. A receiver disposed on the first streamer 125 can receive the diffracted waves. A receiver disposed on the second streamer 130 can receive the diffracted waves.

Figure 3:
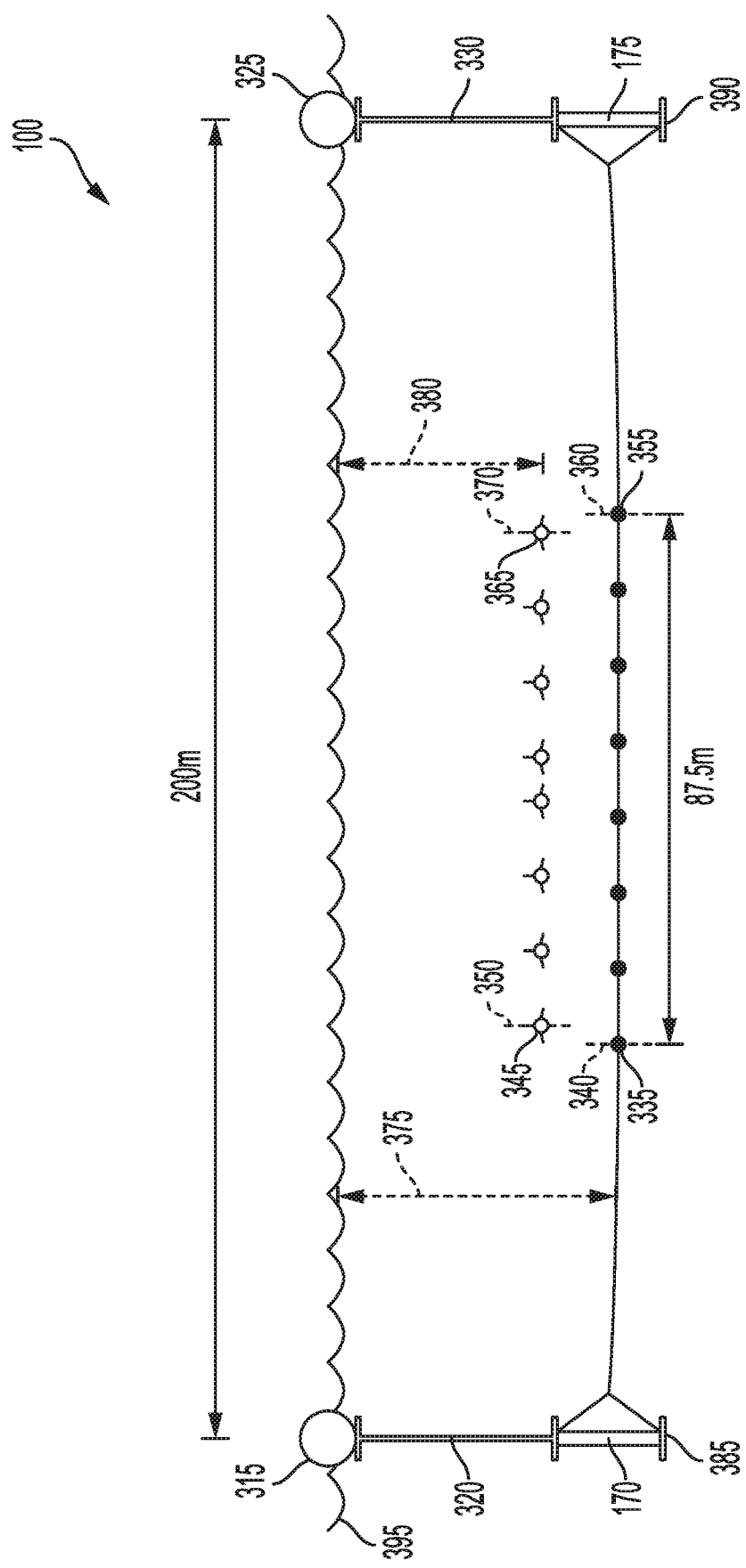
FIG. 3 illustrates a seabed object detection system according to an example implementation.

FIG. 3 illustrates a seabed object detection system 100. The seabed object detection system 100 can include a first buoy 315 coupled with the first diverter 170. The first buoy 315 can be connected to the first diverter 170. The first buoy 315 can be connected to a first rod 320. The first buoy 315 can be coupled to the first rod 320. The first buoy 315 can float on a sea surface 395. The sea surface 395 can include an ocean surface 395. The first buoy 315 can be a floating device. The first buoy 315 can be anchored. The first buoy 315 can be allowed to drift with ocean currents. The first buoy 315 can be towed by the vessel 102.

The seabed object detection system 100 can include a second buoy 325 coupled with the second diverter 175. The seabed object detection system 100 can include a second buoy 325 coupled with the second diverter 175. The second buoy 325 can be connected to the second diverter 175. The second buoy 325 can be connected to a second rod 330. The second buoy 325 can be coupled to the first rod 320. The second buoy 325 can float on a sea surface 395. The second buoy 325 can be a floating device. The second buoy 325 can be anchored. The second buoy 325 can be allowed to drift with ocean currents. The second buoy 325 can be towed by the vessel 102.

The seabed object detection system 100 can include a first rod 320 coupled with the first buoy 315. The seabed object detection system 100 can include a first rod 320 coupled with the first diverter 170. The first rod 320 can separate the first buoy 315 from the first diverter 170. The first rod 320 can be coupled with the first diverter 170. The first rod 320 can be connected to the first diverter 170. The first rod 320 can be a structural component to separate the first buoy 315 from the first diverter 170.

The seabed object detection system 100 can include a second rod 330 coupled with the second buoy 325. The seabed object detection system 100 can include a second rod 330 coupled with the second diverter 175. The second rod 330 can separate the second buoy 325 from the second diverter 175. The second rod 330 can be coupled with the first diverter 170. The second rod 330 can be connected to the first diverter 170. The second rod 330 can be a structural component to separate the second buoy 325 from the second diverter 175.

The seabed object detection system 100 can include a first end streamer 335 of the plurality of streamers 115. The first end streamer 335 can be disposed at a first end of the receiver array 340. The first end streamer 335 can include a first streamer 125. The first end streamer 335 can include a second streamer 130. The first end streamer 335 can include a third streamer 135. The first end streamer 335 can include a fourth streamer 140. The first end streamer 335 can include a first plurality of receivers 110 coupled with the first end streamer 335. The first end streamer 335 can include a second plurality of receivers 110 coupled with the first end streamer 335. The first end streamer 335 can be coupled to a receiver array cross-cable 195. The first end streamer 335 can be disposed a depth greater than the depth of the source array 127. The first end streamer 335 can be disposed a depth less than the depth of the source array 127.

The seabed object detection system 100 can include a second end streamer 355 of the plurality of streamers 115. The second end streamer 355 can be disposed at a second end of the receiver array 360. The second end of the receiver array 360 can be a distance from the first end of the receiver array 340. The second end of the receiver array 360 can be a distance less than 100 meters from the first end of the receiver array 340. For example, the second end of the receiver array 360 can be 87.5 meters from the first end of the receiver array 340. The second end streamer 355 can include a first streamer 125. The second end streamer 355 can include a second streamer 130. The second end streamer 355 can include a third streamer 135. The second end streamer 355 can include a fourth streamer 140. The second end streamer 355 can include a first plurality of receivers 110 coupled with the second end streamer 355. The second end streamer 355 can include a second plurality of receivers 110 coupled with the second end streamer 355. The second end streamer 355 can be coupled to a receiver array cross-cable 195. The second end streamer 355 can be disposed a depth greater than the depth of the source array 127. The second end streamer 355 can be disposed a depth less than the depth of the source array 127.

The seabed object detection system 100 can include a first end source 345 of the plurality of sources. The first end source 345 can be disposed at a first end of the source array 350. The first end source 345 can include the first source 150. The first end source 345 can include the second source 155. The first end source 345 can include the third source 160. The first end source 345 can include the fourth source 165. The first end source 345 can be coupled to the source array cross-cable 197. The first end source 345 can be disposed at a depth less than the depth of the receiver array 105. The first end source 345 can be disposed at a depth greater than the depth of the receiver array 105.

The seabed object detection system 100 can include a second end source 365 of the plurality of sources. The second end source 365 can be disposed at a second end of the source array 370. The second end of the source array 370 can be a distance from the first end of the source array 350. The second end of the source array 370 can be a distance from the first end of the source array 350. The second end of the source array 370 can be a distance less than 100 meters from the first end of the source array 350. For example, the second end of the source array 370 can be less than 87.5 meters from the first end of the source array 350. The second end source 365 can include the first source 150. The second end source 365 can include the second source 155. The second end source 365 can include the third source 160. The second end source 365 can include the fourth source 165. The second end source 365 can be coupled to the source array cross-cable 197. The second end source 365 can be disposed at a depth less than the depth of the receiver array 105. The second end source 365 can be disposed at a depth greater than the depth of the receiver array 105.

The seabed object detection system 100 can include the receiver array cross-cable 195 disposed at a first depth 375. The seabed object detection system 100 can include the receiver array cross-cable 195 disposed at a first depth 375 greater than six meters below a sea surface 395. The seabed object detection system 100 can include the receiver array cross-cable 195 disposed at a first depth 375 less than six meters below a sea surface 395. The seabed object detection system 100 can include the receiver array cross-cable 195 disposed at a first depth 375 equal to six meters below a sea surface 395. The receiver array cross-cable 195 can be disposed at a depth greater than the depth of the source array cross-cable 197. The receiver array cross-cable 195 can be disposed at a depth less than the depth of the source array cross-cable 197. The receiver array cross-cable 195 can be disposed at a depth above the seabed.

The seabed object detection system 100 can include the source array cross-cable 197 disposed at a second depth 380. The seabed object detection system 100 can include the source array cross-cable 197 disposed at a second depth 380 greater than four meters below the sea surface 395. The seabed object detection system 100 can include the source array cross-cable 197 disposed at a second depth 380 less than four meters below the sea surface 395. The seabed object detection system 100 can include the source array cross-cable 197 disposed at a second depth 380 equal to four meters below the sea surface 395. The source array cross-cable 197 can be disposed at a depth greater than the depth of the receiver array cross-cable 195. The source array cross-cable 197 can be disposed at a depth less than the depth of the receiver array cross-cable 195. The source array cross-cable 197 can be disposed at a depth above the seabed.

The seabed object detection system 100 can include a first depth controller 385 to couple with the first diverter 170. The first depth controller 385 can maintain a depth of the receiver array 105. The first depth controller 385 can be coupled with the first rod 320. The first depth controller 385 can be connected to the first rod 320. The first depth controller 385 can be coupled with the first buoy 315. The first depth controller 385 can be connected to the first buoy 315. The first depth controller 385 can be connected to the vessel 102 by a power cable 190. The power cable 190 can transmit electrical power from the vessel 102 to the first depth controller 385.

The seabed object detection system 100 can include a second depth controller 390 to couple with the second diverter 175. The second depth controller 390 can maintain a depth of the receiver array 105. The second depth controller 390 can maintain a depth of the receiver array 105. The second depth controller 390 can be coupled with the first rod 320. The second depth controller 390 can be connected to the first rod 320. The second depth controller 390 can be coupled with the first buoy 315. The second depth controller 390 can be connected to the first buoy 315. The second depth controller 390 can be connected to the vessel 102 by a power cable 190. The power cable 190 can transmit electrical power from the vessel 102 to the second depth controller 390.

The seabed object detection system 100 can include the source array 127 coplanar to the receiver array 105. For example, the source array 127 can define a first plane. The first plane can be a plane in which the first source 150 and the second source 155 lie. The first plane can be a plane in which the first source 150 and the third source 160 lie. The first plane can be a plane in which the first source 150 and the fourth source 165 lie. The receiver array 105 can define a second plane. The second plane can be a plane in which one receiver of the first plurality of receivers 110 and one receiver of the second plurality of receivers 120 lie. The second plane can be a plane in which a first receiver of the first plurality of receivers 110 and a second receiver of the first plurality of receivers 110 lie. The second plane can be a plane in which a first receiver of the second plurality of receivers 120 and a second receiver of the second plurality of receivers 120 lie.

Figure 4:
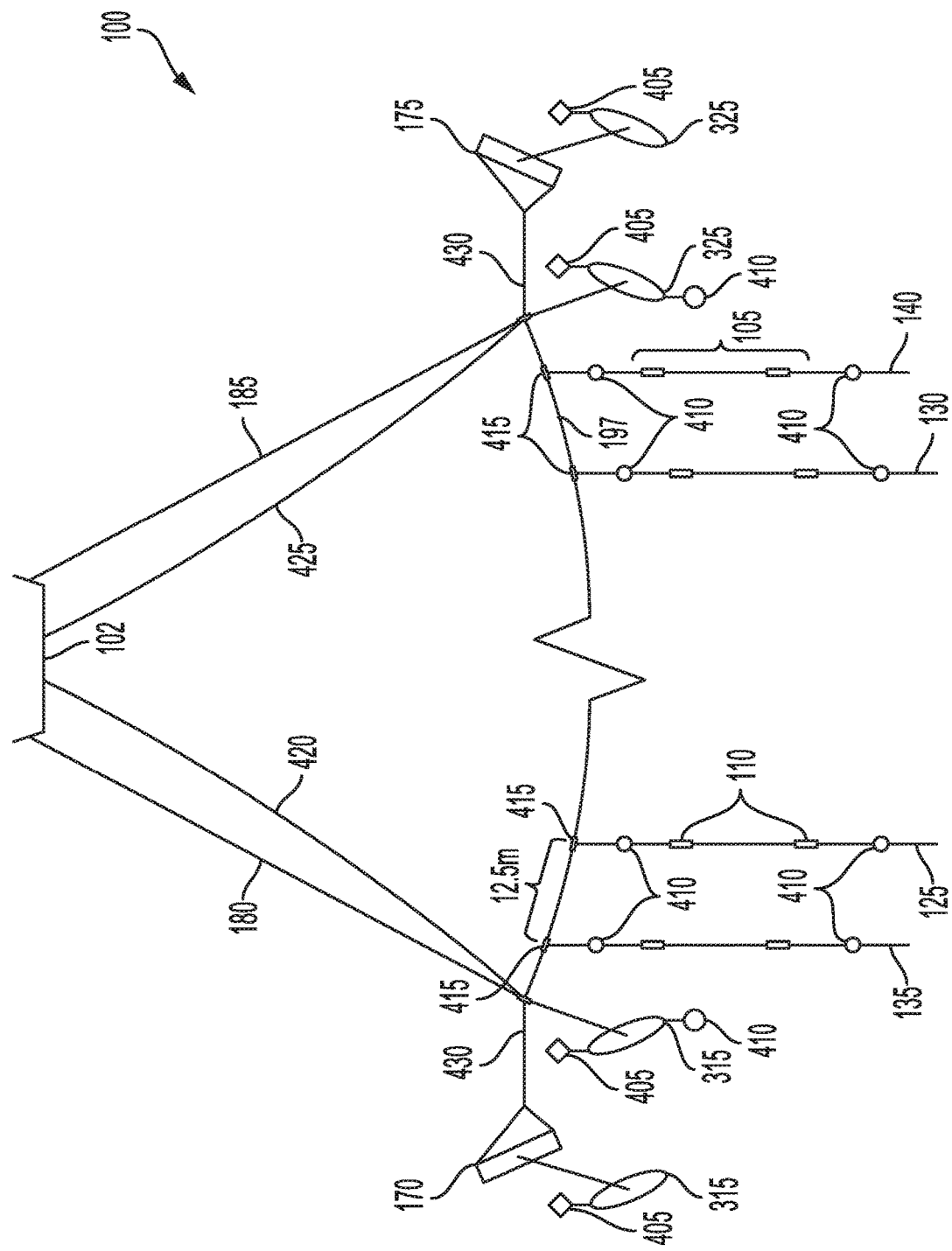
FIG. 4 illustrates a seabed object detection system according to an example implementation.

FIG. 4 illustrates a seabed object detection system 100. The seabed object detection system 100 can include a vessel 102. The vessel 102 can tow the receiver array 105. The vessel 102 can tow the source array 127. The vessel 102 can tow the source array 127 in a tow direction 101. The vessel 102 can tow the receiver array 105 in a tow direction 101. The vessel can tow the source array cross-cable 197 ahead of the receiver array cross-cable 195 relative to the tow direction 101. For example, the vessel 102 can tow the source array cross-cable 197 in the tow direction 101. The vessel 102 can tow the receiver array cross-cable 195 in the tow direction 101. A portion of the source array cross-cable 197 can be ahead of a portion of the receiver array cross-cable 195 relative to the tow direction 101. The vessel 102 can be coupled to the first lateral cable 180. The vessel 102 can be coupled to the second lateral cable 185.

The seabed object detection system 100 can include a first lateral cable 180. The first lateral cable 180 can include a tow rope. The seabed object detection system 100 can include a first lateral cable 180 to couple with a first diverter 170. The first lateral cable 180 can couple with the source array cross-cable 197. For example, the first lateral cable 180 may be a cable (e.g., a surface marine cable), an assembly of wires, a tether, or a rope. The first lateral cable 180 can connect with the source array cross-cable 197. The first lateral cable 180 can couple with the receiver array cross-cable 195. The receiver array cross-cable 195 can couple with the first diverter 170. The first lateral cable 180 can couple directly to the first diverter 170. The first lateral cable 180 can couple to the first diverter 170 through a secondary cable. The first lateral cable 180 can be coupled with the receiver array cross-cable 195 to connect with the first diverter 170. The first lateral cable 180 can be coupled with the receiver array cross-cable 195 to connect with the first diverter 170 at the first lateral cable distal end 171. The first lateral cable 180 may be a power cable to transmit electrical power from the vessel 102 to the first source 150. The first lateral cable 180 may be a power cable to transmit electrical power from the vessel 102 to the second source 155. The first lateral cable 180 may be a power cable to transmit electrical power from the vessel 102 to the first plurality of receivers 110. The first lateral cable 180 may be a power cable to transmit electrical power from the vessel 102 to the second plurality of receivers 120.

The seabed object detection system 100 can include a second lateral cable 185. The second lateral cable 185 can include a tow rope. The seabed object detection system 100 can include a second lateral cable 185 to couple with a second diverter 175. The second lateral cable 185 can couple with the source array cross-cable 197. For example, the second lateral cable 185 may be a cable (e.g., a surface marine cable), an assembly of wires, a tether, or a rope. The second lateral cable 185 can connect with the source array cross-cable 197. The second lateral cable 185 can couple with the receiver array cross-cable 195. The receiver array cross-cable 195 can couple with the second diverter 175. The second lateral cable 185 can couple directly to the second diverter 175. The second lateral cable 185 can couple to the second diverter 175 through a secondary cable. The second lateral cable 185 can be coupled with the receiver array cross-cable 195 to connect with the second diverter 175. The second lateral cable 185 can be coupled with the receiver array cross-cable 195 to connect with the second diverter 175 at the second lateral cable distal end 181. The second lateral cable 185 may be a power cable to transmit electrical power from the vessel 102 to the first source 150. The second lateral cable 185 may be a power cable to transmit electrical power from the vessel 102 to the second source 155. The second lateral cable 185 may be a power cable to transmit electrical power from the vessel 102 to the first plurality of receivers 110. The second lateral cable 185 may be a power cable to transmit electrical power from the vessel 102 to the second plurality of receivers 120.

The seabed object detection system 100 can include a cross cable. The cross cable can include a source array cross-cable 197. The source array cross-cable 197 can couple with the first source 150. The source array cross-cable 197 can connect with the first source 150. The source array cross-cable 197 can couple with the first source 150 through a secondary cable. The source array cross-cable 197 can couple with the second source 155. The source array cross-cable 197 can connect with the second source 155. The source array cross-cable 197 can couple with the second source 155 through a secondary cable. The source array cross-cable 197 may be a power cable to transmit electrical power from the vessel 102 to the first source 150. The source array cross-cable 197 may be a power cable to transmit electrical power from the vessel 102 to the second source 155. The source array cross-cable 197 can be disposed at a second depth of the body of water.

The seabed object detection system 100 can include a streamer. The streamer can include a first streamer 125. The streamer can include a second streamer 130. The receiver array cross-cable 195 can couple with the first streamer 125. For example, the first streamer 125 can be tied to the receiver array cross-cable 195. The receiver array cross-cable 195 can couple with the first streamer 125 at a first end of the first streamer 125. The first streamer 125 can couple to the receiver array cross-cable 195 at multiple connections points. The receiver array cross-cable 195 can couple with the second streamer 130. For example, the second streamer 130 can be tied to the receiver array cross-cable 195. The receiver array cross-cable 195 can couple with the second streamer 130 at a first end of the second streamer 130. The second streamer 130 can couple to the receiver array cross-cable 195 at multiple connections points. The receiver array cross-cable 195 can couple with a source array cross-cable 197. The receiver array cross-cable 195 can couple with a first lateral cable 180. The receiver array cross-cable 195 can couple with the first lateral cable 180 at a first lateral cable distal end 171. The receiver array cross-cable 195 can couple with a first diverter 170. The receiver array cross-cable 195 can couple with a second diverter 175. The receiver array cross-cable 195 can couple with a second lateral cable 185. The receiver array cross-cable 195 can couple with the second lateral cable 185 at a second lateral cable distal end 181. The receiver array cross-cable 195 may be a power cable to transmit electrical power from the vessel 102 to the first plurality of receivers 110. The receiver array cross-cable 195 may be a power cable to transmit electrical power from the vessel 102 to the second plurality of receivers 120. The receiver array cross-cable 195 can be disposed at a first depth of a body of water.

The streamer can include a third streamer 135. The seabed object detection system 100 can include a third streamer 135. The third streamer 135 can be located a first distance from the first streamer 125. The third streamer 135 can be located a first distance from the second streamer 130. The first distance can include distances between 5 meters and 30 meters. For example, the first distance can be 12.5 meters. The third streamer 135 may be a cable (e.g., a surface marine cable), an assembly of wires, or any component capable of connecting a receiver to a recording device which may be located on the vessel 102. The receiver array 105 can include the third streamer 135. The receiver array 105 can include multiple third streamers 135. For example, the receiver array 105 can include one, two, three, or more third streamers 135.

The streamer can include a fourth streamer 140. The seabed object detection system 100 can include a fourth streamer 140. The fourth streamer 140 can be located a first distance from the first streamer 125. The fourth streamer 140 can be located a first distance from the second streamer 130. The first distance can include distances between 5 meters and 30 meters. For example, the first distance can be 12.5 meters. The fourth streamer 140 may be a cable (e.g., a surface marine cable), an assembly of wires, or any component capable of connecting a receiver to a recording device which may be located on the vessel 102. The receiver array 105 can include the fourth streamer 140. The receiver array 105 can include multiple fourth streamers 140. For example, the receiver array 105 can include one, two, three, or more fourth streamers 140.

The seabed object detection system 100 can include a module. The module can include a receiver of the first plurality of receivers 110. The seabed object detection system 100 can include a first plurality of receivers 110. The first plurality of receivers 110 can be coupled with the first streamer 125. The first plurality of receivers 110 can be disposed on the first streamer 125. The first plurality of receivers 110 can be coupled to the first streamer 125 along a line. The first plurality of receivers 110 can be evenly spaced along the first streamer 125. The first plurality of receivers 110 can receive diffraction data diffracted off an object in a seabed. For example, a receiver of the first plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The first plurality of receivers 110 can be configured to detect acoustic waves that are reflected by seabed objects. The first plurality of receivers 110 can be configured to detect acoustic waves that are diffracted by seabed objects. The first plurality of receivers 110 can detect diffraction data from edges of objects. For example, the first plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The first plurality of receivers 110 can detect objects with irregular surface features. For example, the first plurality of receivers 110 can detect objects with facets, edges, sharp boundaries, or textures. The seabed objects can be completely buried within the seabed. The seabed objects can be partially buried within the seabed.

The module can include a receiver of the second plurality of receivers 110. The seabed object detection system 100 can include a second plurality of receivers 120. The second plurality of receivers 120 can be coupled with the second streamer 130. The second plurality of receivers 120 can be disposed on the second streamer 130. The second plurality of receivers 120 can be coupled to the second streamer 130 along a line. The second plurality of receivers 120 can be evenly spaced along the second streamer 130. The second plurality of receivers 120 can receive diffraction data diffracted off an object in a seabed. For example, a receiver of the second plurality of receivers 120 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The second plurality of receivers 120 can be configured to detect acoustic waves that are reflected by seabed objects. The second plurality of receivers 120 can be configured to detect acoustic waves that are diffracted by seabed objects. The second plurality of receivers 120 can detect diffraction data from edges of objects. For example, the second plurality of receivers 120 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The second plurality of receivers 120 can detect objects with irregular surface features. For example, second plurality of receivers 120 can detect objects with facets, edges, sharp boundaries, or textures. The seabed objects can be completely buried within the seabed. The seabed objects can be partially buried within the seabed.

The seabed object detection system 100 can include a first buoy 315. The seabed object detection system 100 can include the first buoy 315 coupled with the first diverter 170. The first buoy 315 can be connected to the first diverter 170. The first buoy 315 can be connected to a first rod 320. The first buoy 315 can be coupled to the first rod 320. The first buoy 315 can float on a sea surface 395. The first buoy 315 can be a floating device. The first buoy 315 can be anchored. The first buoy 315 can be allowed to drift with ocean currents. The first buoy 315 can be towed by the vessel 102.

The seabed object detection system 100 can include a second buoy 325. The seabed object detection system 100 can include the second buoy 325 coupled with the second diverter 175. The seabed object detection system 100 can include a second buoy 325 coupled with the second diverter 175. The second buoy 325 can be connected to the second diverter 175. The second buoy 325 can be connected to a second rod 330. The second buoy 325 can be coupled to the first rod 320. The second buoy 325 can float on a sea surface 395. The second buoy 325 can be a floating device. The second buoy 325 can be anchored. The second buoy 325 can be allowed to drift with ocean currents. The second buoy 325 can be towed by the vessel 102.

The seabed object detection system 100 can include a relative global positioning system (RGPS) 405. The RGPS 405 can determine where an object is located on earth with respect to another object's location. The RGPS 405 can determine the horizontal distances between one object to another object. The RGPS 405 can determine the vertical distances between one object to another object. The RGPS 405 can determine the offsets between one object to another object. For example, the RGPS 405 can determine the position of the first diverter 170 relative to the vessel 102. The RGPS 405 can determine the position of the second diverter 175 relative to the vessel 102. The RGPS 405 can determine relative positioning between two moving objects. The RGPS 405 can be connected to the first buoy 315. The RGPS 405 can be coupled to the first buoy 315. The RGPS 405 can be connected to the second buoy 325. The RGPS 405 can be coupled to the second buoy 325.

The seabed object detection system 100 can include an acoustic transducer 410. The acoustic transducer 410 can convert acoustic signals into electrical signals. The electrical signals may be transmitted to the vessel 102. The acoustic transducer 410 can include a hydrophone. The acoustic transducer 410 can include a first plurality of receivers 110. The acoustic transducer 410 can include a first plurality of receivers 110 coupled with the first streamer 125. The acoustic transducer 410 can include a second plurality of receivers 120. The acoustic transducer 410 can include a second plurality of receivers 120 coupled with the second streamer 130. The acoustic transducer 410 can be disposed on a streamer. A plurality of acoustic transducers 410 can be disposed on a plurality of streamers 115.

The seabed object detection system 100 can include a T-connector 415. The T-connector 415 can include a tee connector. The T-connecter 415 can include an electrical connect that connects three cables together. The T-connector 415 can connect the receiver array cross-cable 195 to the receiver array 105. The T-connector 415 can couple the receiver array cross-cable 195 to the receiver array 105. For example, the T-connector 415 can connect the receiver array cross-cable 195 to the first streamer 125. The T-connector 415 can couple the receiver array cross-cable 195 to the first streamer 125. For example, the T-connector 415 can connect the receiver array cross-cable 195 to the second streamer 130. The T-connector 415 can couple the receiver array cross-cable 195 to the second streamer 130. For example, the T-connector 415 can connect the receiver array cross-cable 195 to the third streamer 135. The T-connector 415 can couple the receiver array cross-cable 195 to the third streamer 135. For example, the T-connector 415 can connect the receiver array cross-cable 195 to the fourth streamer 140. The T-connector 415 can couple the receiver array cross-cable 195 to the fourth streamer 140.

The seabed object detection system 100 can include a recovery line 420. The recovery line 420 may be a cable (e.g., a surface marine cable), an assembly of wires, or any component capable of connecting a receiver to a recording device which may be located on a vessel 102. The recovery line 420 can connect the vessel 102 to the receiver array cross-cable 195. The recovery line 420 can connect the vessel 102 to the source array cross-cable 197.

The seabed object detection system 100 can include a signal cable 425. The signal cable 425 can include a power cable 190. The power cable 190 can provide power to the first source 150. For example, the power cable 190 may be a power cable to transmit electrical power from the vessel 102 to the first source 150. The power cable 190 may be a power cable to transmit electrical power from the source array cross-cable 197 to the first source 150. The power cable 190 may be multiple power cables. The seabed object detection system 100 can include a power cable 190 to provide power to the second source 155. For example, the power cable 190 may be a power cable to transmit electrical power from the vessel 102 to the second source 155. The power cable 190 may be a power cable to transmit electrical power from the source array cross-cable 197 to the second source 155.

The seabed object detection system 100 can include a power cable 190 to provide power to the third source 160. For example, the power cable 190 may be a power cable to transmit electrical power from the vessel 102 to the third source 160. The power cable 190 may be a power cable to transmit electrical power from the source array cross-cable 197 to the third source 160. The power cable 190 may be multiple power cables. The seabed object detection system 100 can include a power cable 190 to provide power to the fourth source 165. For example, the power cable 190 may be a power cable to transmit electrical power from the vessel 102 to the fourth source 165. The power cable 190 may be a power cable to transmit electrical power from the source array cross-cable 197 to the fourth source 165.

The seabed object detection system 100 can include a spur line 430. The spur line 430 may be a cable (e.g., a surface marine cable), an assembly of wires, or any component capable of connecting a receiver to a recording device which may be located on a vessel 102. The spur line 430 can connect the first diverter 170 to the vessel 102. The spur line 430 can couple the first diverter 170 to the vessel 102. The spur line 430 can couple the first diverter 170 to the receiver array cross-cable 195. The spur line 430 can connect the second diverter 175 to the vessel 102. The spur line 430 can couple the second diverter 175 to the vessel 102. The spur line 430 can couple the second diverter 175 to the receiver array cross-cable 195.

Figure 5:
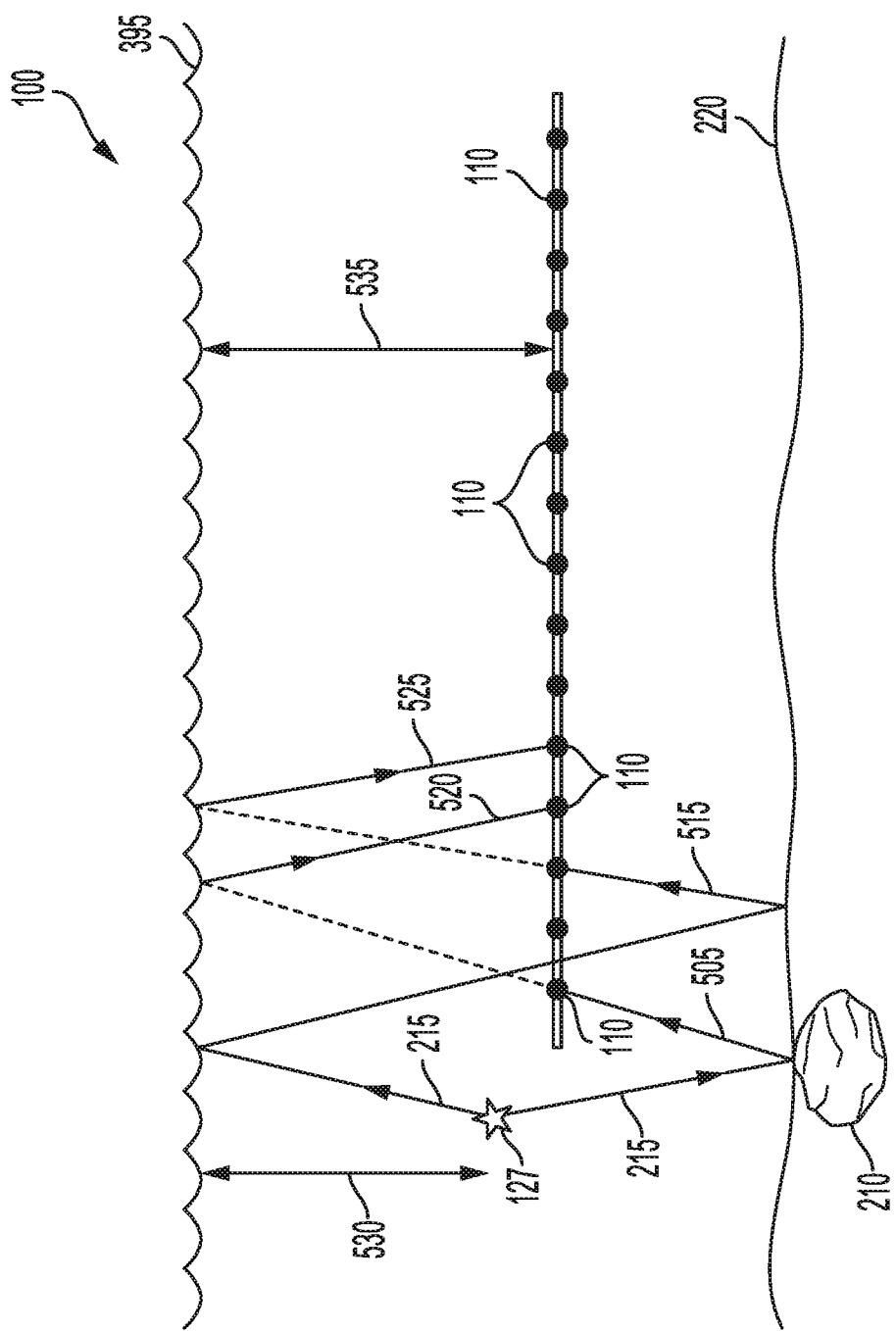
FIG. 5 illustrates a seabed object detection system according to an example implementation.

FIG. 5 illustrates a seabed object detection system 100. The seabed object detection system 100 can include at least one receiver of the first plurality of receivers 110. The at least one receiver of the first plurality of receivers 110 can receive reflection data 505 reflected off an object in a seabed 220. The reflection data 505 can include reflected waves. The reflection data 505 can include a wavelet. The at least one receiver of the first plurality of receivers 110 can receive reflected waves from the object in the seabed 220. The source array 127 can generate a source shot 215. The source shot 215 can travel through a medium (e.g., sea water) and reflect off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data 505. The reflection data 505 may include a reflected wave. The receiver array 105 can receive reflection data 505. For example, the receiver array 105 can receive the reflected wave. A receiver of the first plurality of receivers 110 can receive the reflected wave. The reflection data 505 can include a reflected wave originating from a seabed object. The reflection data 505 can include the reflected wave generated from a source shot 215. The plurality of sources of the source array 127 can generate an acoustic signal. The first plurality of receivers 110 of the receiver array 105 can receive reflection data 505 reflected off the object in the seabed 220. The reflection data 505 can include a reflected wave. A receiver of the first plurality of receivers 110 can receive the reflected wave reflected off the object in the seabed 220 and generated by a source of the plurality of sources of the source array 127. The source array 127 can be disposed at a distance 530 below the sea surface 395. The receiver array 105 can be disposed at a distance 535 below the sea surface 395.

The at least one receiver of the first plurality of receivers 110 can receive reflection data 515 reflected off the ocean surface 395 and the object in the seabed 220. The at least one receiver of the first plurality of receivers 110 can receive reflection data 515 reflected off the object in the seabed 220 subsequent to reflecting off the ocean surface 395. The at least one receiver of the first plurality of receivers 110 can receive reflected waves from the ocean surface 395. The reflection data 515 can include reflected waves. The reflection data 515 can include a wavelet. The at least one receiver of the first plurality of receivers 110 can receive reflected waves from the ocean surface 395. The source array 127 can generate a source shot 215. The source shot 215 can travel through a medium (e.g., sea water) and reflect off the ocean surface 395. The waves that reflect off the ocean surface 395 may include reflection data 515. The reflection data 515 may include a reflected wave. The receiver array 105 can receive reflection data 515. For example, the receiver array 105 can receive the reflected wave. A receiver of the first plurality of receivers 110 can receive the reflected wave. The reflection data 515 can include a reflected wave originating from the ocean surface 395. The reflection data 515 can include the reflected wave generated from a source shot 215. The plurality of sources of the source array 127 can generate an acoustic signal. The first plurality of receivers 110 of the receiver array 105 can receive reflection data 515 reflected off the ocean surface 395. The reflection data 515 can include a reflected wave. A receiver of the first plurality of receivers 110 can receive the reflected wave reflected off the ocean surface 395 and generated by a source of the plurality of sources of the source array 127.

The at least one receiver of the first plurality of receivers 110 can receive reflection data 520 reflected off a seabed 220 and reflected off the ocean surface 395. The at least one receiver of the first plurality of receivers 110 can receive reflection data 520 reflected off the ocean surface 395 subsequent to reflecting off the object in the seabed 220. The at least one receiver of the first plurality of receivers 110 can receive reflected waves from the seabed 220 and the ocean surface 395. The reflection data 520 can include reflected waves. The reflection data 520 can include a wavelet. The at least one receiver of the first plurality of receivers 110 can receive reflected waves from the ocean surface 395. The source array 127 can generate a source shot 215. The source shot 215 can travel through a medium (e.g., sea water) and reflect off the seabed 220. The waves that reflect off the seabed 220 may include reflection data 520. The waves that reflect off the seabed 220 and reflect off the ocean surface 395 may include reflection data 520. The reflection data 520 may include a reflected wave. The receiver array 105 can receive reflection data 520. For example, the receiver array 105 can receive the reflected wave. A receiver of the first plurality of receivers 110 can receive the reflected wave. The reflection data 520 can include a reflected wave originating from the seabed 220. The reflection data 520 can include the reflected wave generated from a source shot 215. The plurality of sources of the source array 127 can generate an acoustic signal. The first plurality of receivers 110 of the receiver array 105 can receive reflection data 520 reflected off the seabed 220 and reflected off the ocean surface 395. The reflection data 520 can include a reflected wave. A receiver of the first plurality of receivers 110 can receive the reflected wave reflected off the seabed 220 and generated by a source of the plurality of sources of the source array 127.

The at least one receiver of the first plurality of receivers 110 can receive reflection data 525 reflected twice off the ocean surface 395 and off the object in the seabed 220. The reflection data 525 can include reflected waves. The reflection data 525 can include a wavelet. The at least one receiver of the first plurality of receivers 110 can receive reflected waves from the ocean surface 395. The at least one receiver of the first plurality of receivers 110 can receive reflection data 525 reflected off the ocean surface 395 subsequent to reflecting off the object in the seabed 220 subsequent to reflecting off the ocean surface 395. The source array 127 can generate a source shot 215. The source shot 215 can travel through a medium (e.g., sea water) and reflect off the ocean surface 395. The reflected waves from the ocean surface 395 can reflect off the seabed 220. The reflected waves from the seabed 220 can reflect off the ocean surface 395 again. The waves that reflect off the ocean surface 395 may include reflection data 525. The waves that reflect twice off the ocean surface 395 may include reflection data 525. The reflection data 525 may include a reflected wave. The receiver array 105 can receive reflection data 525. For example, the receiver array 105 can receive the reflected wave. A receiver of the first plurality of receivers 110 can receive the reflected wave. The reflection data 525 can include a reflected wave originating from the seabed 220. The reflection data 525 can include the reflected wave generated from a source shot 215. The plurality of sources of the source array 127 can generate an acoustic signal. The first plurality of receivers 110 of the receiver array 105 can receive reflection data 525 reflected twice off the ocean surface 395. The reflection data 525 can include a reflected wave. A receiver of the first plurality of receivers 110 can receive the reflected wave reflected twice off the ocean surface 395 and generated by a source of the plurality of sources of the source array 127.

Figure 6:
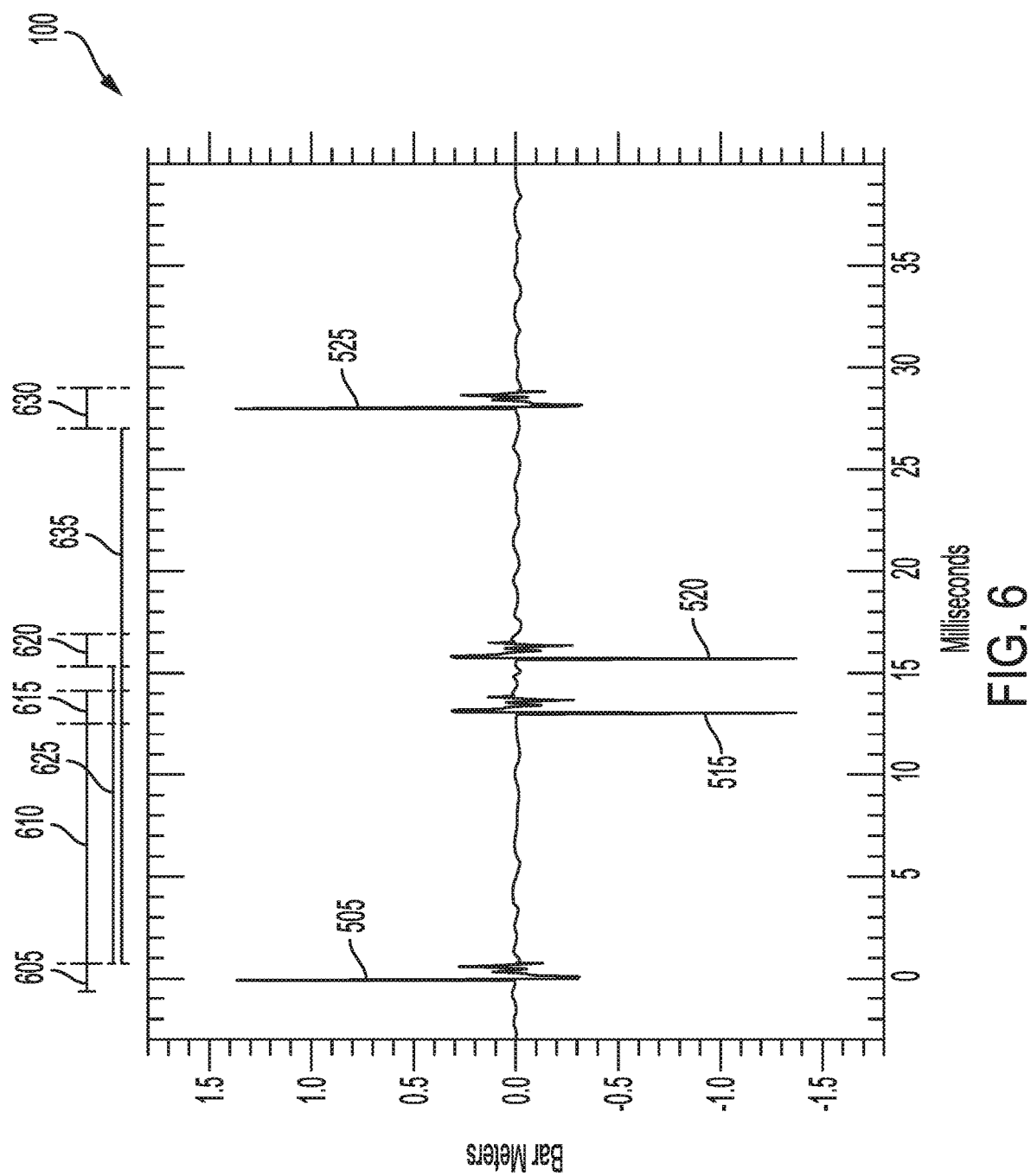
FIG. 6 illustrates a seabed object detection system according to an example

FIG. 6 illustrates a seabed object detection system 100. The seabed object detection system 100 includes at least one receiver of the first plurality of receivers 110 to receive reflection data 505 reflected off an object in a seabed during a first time period 605. The reflection data 505 can include reflected waves. The at least one receiver of the first plurality of receivers 110 can receive reflected waves from the object in the seabed 220 during a first time period 605. The source array 127 can generate a source shot 215. The source shot 215 can travel through a medium (e.g., sea water) and reflect off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data 505. The reflection data 505 may include a reflected wave. The receiver array 105 can receive reflection data 505 during a first time period 605. For example, the receiver array 105 can receive the reflected wave during a first time period 605. A receiver of the first plurality of receivers 110 can receive the reflected wave. The reflection data 505 can include a reflected wave originating from a seabed object. The reflection data 505 can include the reflected wave generated from a source shot 215. The plurality of sources of the source array 127 can generate an acoustic signal. The first plurality of receivers 110 of the receiver array 105 can receive reflection data 505 reflected off the object in the seabed 220 during a first time period 605. The reflection data 505 can include a reflected wave. A receiver of the first plurality of receivers 110 can receive the reflected wave reflected off the object in the seabed 220 and generated by a source of the plurality of sources of the source array 127. The first time period 605 can be less than twice the difference between the distance 530 below the sea surface 395 and the distance 535 below the sea surface 395 divided by the velocity of the wavelet. The first time period 605 can be less than 1 millisecond. The first time period 605 can be less than 5 milliseconds. The first intervening time period 610 can be less than 15 milliseconds. The first intervening time period 610 can be less than 10 milliseconds. The first intervening time period 610 can be less than 5 milliseconds. The first intervening time period 610 can be less than 1 millisecond. The first intervening time period 610 can be 0 milliseconds. The first intervening time period can be at least 5 milliseconds.

The at least one receiver of the first plurality of receivers 110 can receive reflection data 515 reflected off an ocean surface 395 and the object in the seabed 220 during a second time period 615. The at least one receiver of the first plurality of receivers 110 can receive reflected waves from the ocean surface 395 and the object in the seabed 220 during a second time period 615. The reflection data 515 can include reflected waves. The at least one receiver of the first plurality of receivers 110 can receive reflected waves from the ocean surface 395 and the object in the seabed 220 during a second time period 615. The source array 127 can generate a source shot 215. The source shot 215 can travel through a medium (e.g., sea water) and reflect off the ocean surface 395 and the object in the seabed 220. The waves that reflect off the ocean surface 395 and the object in the seabed 220 may include reflection data 515. The reflection data 515 may include a reflected wave. The receiver array 105 can receive reflection data 515 during a second time period 615. For example, the receiver array 105 can receive the reflected wave during a second time period 615. A receiver of the first plurality of receivers 110 can receive the reflected wave. The reflection data 515 can include a reflected wave originating from the object in the seabed 220. The reflection data 515 can include the reflected wave generated from a source shot 215. The plurality of sources of the source array 127 can generate an acoustic signal. The first plurality of receivers 110 of the receiver array 105 can receive reflection data 515 reflected off the ocean surface 395 and the object in the seabed 220. The reflection data 515 can include a reflected wave. A receiver of the first plurality of receivers 110 can receive the reflected wave reflected off the ocean surface 395 and the object in the seabed 220, and generated by a source of the plurality of sources of the source array 127. The second time period 615 can be less than twice the difference between the distance 530 below the sea surface 395 and the distance 535 below the sea surface 395 divided by the velocity of the wavelet. The second time period 615 can be less than 1 millisecond. The second time period 615 can be less than 5 milliseconds. The first intervening time period 610 can be less than 15 milliseconds. The first intervening time period 610 can be less than 10 milliseconds. The first intervening time period 610 can be less than 5 milliseconds. The first intervening time period 610 can be less than 1 millisecond. The first intervening time period 610 can be 0 milliseconds. The first intervening time period can be at least 5 milliseconds.

The at least one receiver of the first plurality of receivers 110 can receive reflection data 520 reflected off the object in the seabed 220 and reflected off the ocean surface 395 during a third time period 620. The at least one receiver of the first plurality of receivers 110 can receive reflected waves from the object in the seabed 220 and the ocean surface 395 during a third time period 620. The reflection data 520 can include reflected waves. The at least one receiver of the first plurality of receivers 110 can receive reflected waves from the ocean surface 395 during a third time period 620. The source array 127 can generate a source shot 215. The source shot 215 can travel through a medium (e.g., sea water) and reflect off the seabed 220. The waves that reflect off the seabed 220 may include reflection data 520. The waves that reflect off the seabed 220 and reflect off the ocean surface 395 may include reflection data 520. The reflection data 520 may include a reflected wave. The receiver array 105 can receive reflection data 520 during a third time period 620.

For example, the receiver array 105 can receive the reflected wave. A receiver of the first plurality of receivers 110 can receive the reflected wave during a third time period 620. The reflection data 520 can include a reflected wave originating from the seabed 220. The reflection data 520 can include the reflected wave generated from a source shot 215. The plurality of sources of the source array 127 can generate an acoustic signal. The first plurality of receivers 110 of the receiver array 105 can receive reflection data 520 reflected off the seabed 220 and reflected off the ocean surface 395 during a third time period 620. The reflection data 520 can include a reflected wave. A receiver of the first plurality of receivers 110 can receive the reflected wave reflected off the seabed 220 and generated by a source of the plurality of sources of the source array 127. The third time period 620 can be less than twice the difference between the distance 530 below the sea surface 395 and the distance 535 below the sea surface 395 divided by the velocity of the wavelet. The third time period 620 can be less than 1 millisecond. The third time period 620 can be less than 5 milliseconds. The second intervening time period 625 can be less than 20 milliseconds. The second intervening time period 625 can be less than 15 milliseconds. The second intervening time period 625 can be less than 10 milliseconds. The second intervening time period 625 can be less than 5 milliseconds. The second intervening time period 625 can be less than 1 millisecond. The second intervening time period 625 can be 0 milliseconds.

The at least one receiver of the first plurality of receivers 110 can receive reflection data 525 reflected twice off the ocean surface 395 and off the object in the seabed 220 during a fourth time period 630. The reflection data 525 can include reflected waves. The at least one receiver of the first plurality of receivers 110 can receive reflected waves from the ocean surface 395 during a fourth time period 630. The source array 127 can generate a source shot 215. The source shot 215 can travel through a medium (e.g., sea water) and reflect off the ocean surface 395. The reflected waves from the ocean surface 395 can reflect off the seabed 220. The reflected waves from the seabed 220 can reflect off the ocean surface 395 again. The waves that reflect off the ocean surface 395 may include reflection data 525. The waves that reflect twice off the ocean surface 395 and off the seabed 220 may include reflection data 525. The reflection data 525 may include a reflected wave. The receiver array 105 can receive reflection data 525 during a fourth time period 630. For example, the receiver array 105 can receive the reflected wave. A receiver of the first plurality of receivers 110 can receive the reflected wave. The reflection data 525 can include a reflected wave originating from the ocean surface 395. The reflection data 525 can include the reflected wave generated from a source shot 215. The plurality of sources of the source array 127 can generate an acoustic signal. The first plurality of receivers 110 of the receiver array 105 can receive reflection data 525 reflected twice off the ocean surface 395 and off the seabed 220 during a fourth time period 630. The reflection data 525 can include a reflected wave. A receiver of the first plurality of receivers 110 can receive the reflected wave reflected twice off the ocean surface 395 and off the seabed 220, and generated by a source of the plurality of sources of the source array 127. The fourth time period 630 can be less than twice the difference between the distance 530 below the sea surface 395 and the distance 535 below the sea surface 395 divided by the velocity of the wavelet. The fourth time period 630 can be less than 1 millisecond. The fourth time period 630 can be less than 5 milliseconds. The third intervening time period 635 can be less than 30 milliseconds. The third intervening time period 635 can be less than 25 milliseconds. The third intervening time period 635 can be less than 20 milliseconds. The third intervening time period 635 can be less than 15 milliseconds. The third intervening time period 635 can be less than 10 milliseconds. The third intervening time period 635 can be less than 5 milliseconds. The third intervening time period 635 can be 0 milliseconds.

The seabed object detection system 100 includes at least one receiver of the second plurality of receivers 120 to receive reflection data 505 reflected off an object in a seabed during a first time period 605. The reflection data 505 can include reflected waves. The at least one receiver of the second plurality of receivers 120 can receive reflected waves from the object in the seabed 220 during a first time period 605. The source array 127 can generate a source shot 215. The source shot 215 can travel through a medium (e.g., sea water) and reflect off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data 505. The reflection data 505 may include a reflected wave. The receiver array 105 can receive reflection data 505 during a first time period 605. For example, the receiver array 105 can receive the reflected wave during a first time period 605. A receiver of the second plurality of receivers 120 can receive the reflected wave. The reflection data 505 can include a reflected wave originating from a seabed object. The reflection data 505 can include the reflected wave generated from a source shot 215. The plurality of sources of the source array 127 can generate an acoustic signal. The second plurality of receivers 120 of the receiver array 105 can receive reflection data 505 reflected off the object in the seabed 220 during a first time period 605. The reflection data 505 can include a reflected wave. A receiver of the second plurality of receivers 120 can receive the reflected wave reflected off the object in the seabed 220 and generated by a source of the plurality of sources of the source array 127. The first time period 605 can be less than twice the difference between the distance 530 below the sea surface 395 and the distance 535 below the sea surface 395 divided by the velocity of the wavelet. The first time period 605 can be less than 1 millisecond. The first time period 605 can be less than 5 milliseconds. The first intervening time period 610 can be less than 15 milliseconds. The first intervening time period 610 can be less than 10 milliseconds. The first intervening time period 610 can be less than 5 milliseconds. The first intervening time period 610 can be less than 1 millisecond. The first intervening time period 610 can be 0 milliseconds. The first intervening time period can be at least 5 milliseconds.

The at least one receiver of the second plurality of receivers 120 can receive reflection data 515 reflected off an ocean surface 395 and the object in the seabed 220 during a second time period 615. The at least one receiver of the second plurality of receivers 120 can receive reflected waves from the ocean surface 395 and the object in the seabed 220 during a second time period 615. The reflection data 515 can include reflected waves. The at least one receiver of the second plurality of receivers 120 can receive reflected waves from the ocean surface 395 and the object in the seabed 220 during a second time period 615. The source array 127 can generate a source shot 215. The source shot 215 can travel through a medium (e.g., sea water) and reflect off the ocean surface 395 and the object in the seabed 220. The waves that reflect off the ocean surface 395 and the object in the seabed 220 may include reflection data 515. The reflection data 515 may include a reflected wave. The receiver array 105 can receive reflection data 515 during a second time period 615. For example, the receiver array 105 can receive the reflected wave during a second time period 615. A receiver of the second plurality of receivers 120 can receive the reflected wave. The reflection data 515 can include a reflected wave originating from the object in the seabed 220. The reflection data 515 can include the reflected wave generated from a source shot 215. The plurality of sources of the source array 127 can generate an acoustic signal. The second plurality of receivers 120 of the receiver array 105 can receive reflection data 515 reflected off the ocean surface 395 and the object in the seabed 220. The reflection data 515 can include a reflected wave. A receiver of the second plurality of receivers 120 can receive the reflected wave reflected off the ocean surface 395 and the object in the seabed 220, and generated by a source of the plurality of sources of the source array 127. The second time period 615 can be less than twice the difference between the distance 530 below the sea surface 395 and the distance 535 below the sea surface 395 divided by the velocity of the wavelet. The second time period 615 can be less than 1 millisecond. The second time period 615 can be less than 5 milliseconds. The first intervening time period 610 can be less than 15 milliseconds. The first intervening time period 610 can be less than 10 milliseconds. The first intervening time period 610 can be less than 5 milliseconds. The first intervening time period 610 can be less than 1 millisecond. The first intervening time period 610 can be 0 milliseconds. The first intervening time period can be at least 5 milliseconds.

The at least one receiver of the second plurality of receivers 120 can receive reflection data 520 reflected off the object in the seabed 220 and reflected off the ocean surface 395 during a third time period 620. The at least one receiver of the second plurality of receivers 120 can receive reflected waves from the object in the seabed 220 and the ocean surface 395 during a third time period 620. The reflection data 520 can include reflected waves. The at least one receiver of the second plurality of receivers 120 can receive reflected waves from the ocean surface 395 during a third time period 620. The source array 127 can generate a source shot 215. The source shot 215 can travel through a medium (e.g., sea water) and reflect off the seabed 220. The waves that reflect off the seabed 220 may include reflection data 520. The waves that reflect off the seabed 220 and reflect off the ocean surface 395 may include reflection data 520. The reflection data 520 may include a reflected wave. The receiver array 105 can receive reflection data 520 during a third time period 620. For example, the receiver array 105 can receive the reflected wave. A receiver of the second plurality of receivers 120 can receive the reflected wave during a third time period 620. The reflection data 520 can include a reflected wave originating from the seabed 220. The reflection data 520 can include the reflected wave generated from a source shot 215. The plurality of sources of the source array 127 can generate an acoustic signal. The second plurality of receivers 120 of the receiver array 105 can receive reflection data 520 reflected off the seabed 220 and reflected off the ocean surface 395 during a third time period 620. The reflection data 520 can include a reflected wave. A receiver of the second plurality of receivers 120 can receive the reflected wave reflected off the seabed 220 and generated by a source of the plurality of sources of the source array 127. The third time period 620 can be less than twice the difference between the distance 530 below the sea surface 395 and the distance 535 below the sea surface 395 divided by the velocity of the wavelet. The third time period 620 can be less than 1 millisecond. The third time period 620 can be less than 5 milliseconds. The second intervening time period 625 can be less than 20 milliseconds. The second intervening time period 625 can be less than 15 milliseconds. The second intervening time period 625 can be less than 10 milliseconds. The second intervening time period 625 can be less than 5 milliseconds. The second intervening time period 625 can be less than 1 millisecond. The second intervening time period 625 can be 0 milliseconds.

The at least one receiver of the second plurality of receivers 120 can receive reflection data 525 reflected twice off the ocean surface 395 and off the object in the seabed 220 during a fourth time period 630. The reflection data 525 can include reflected waves. The at least one receiver of the second plurality of receivers 120 can receive reflected waves from the ocean surface 395 during a fourth time period 630. The source array 127 can generate a source shot 215. The source shot 215 can travel through a medium (e.g., sea water) and reflect off the ocean surface 395. The reflected waves from the ocean surface 395 can reflect off the seabed 220. The reflected waves from the seabed 220 can reflect off the ocean surface 395 again. The waves that reflect off the ocean surface 395 may include reflection data 525. The waves that reflect twice off the ocean surface 395 and off the seabed 220 may include reflection data 525. The reflection data 525 may include a reflected wave. The receiver array 105 can receive reflection data 525 during a fourth time period 630. For example, the receiver array 105 can receive the reflected wave. A receiver of the second plurality of receivers 120 can receive the reflected wave. The reflection data 525 can include a reflected wave originating from the ocean surface 395. The reflection data 525 can include the reflected wave generated from a source shot 215. The plurality of sources of the source array 127 can generate an acoustic signal. The second plurality of receivers 120 of the receiver array 105 can receive reflection data 525 reflected twice off the ocean surface 395 and off the seabed 220 during a fourth time period 630. The reflection data 525 can include a reflected wave. A receiver of the second plurality of receivers 120 can receive the reflected wave reflected twice off the ocean surface 395 and off the seabed 220, and generated by a source of the plurality of sources of the source array 127. The fourth time period 630 can be less than twice the difference between the distance 530 below the sea surface 395 and the distance 535 below the sea surface 395 divided by the velocity of the wavelet. The fourth time period 630 can be less than 1 millisecond. The fourth time period 630 can be less than 5 milliseconds. The third intervening time period 635 can be less than 30 milliseconds. The third intervening time period 635 can be less than 25 milliseconds. The third intervening time period 635 can be less than 20 milliseconds. The third intervening time period 635 can be less than 15 milliseconds. The third intervening time period 635 can be less than 10 milliseconds. The third intervening time period 635 can be less than 5 milliseconds. The third intervening time period 635 can be 0 milliseconds.

Figure 7:
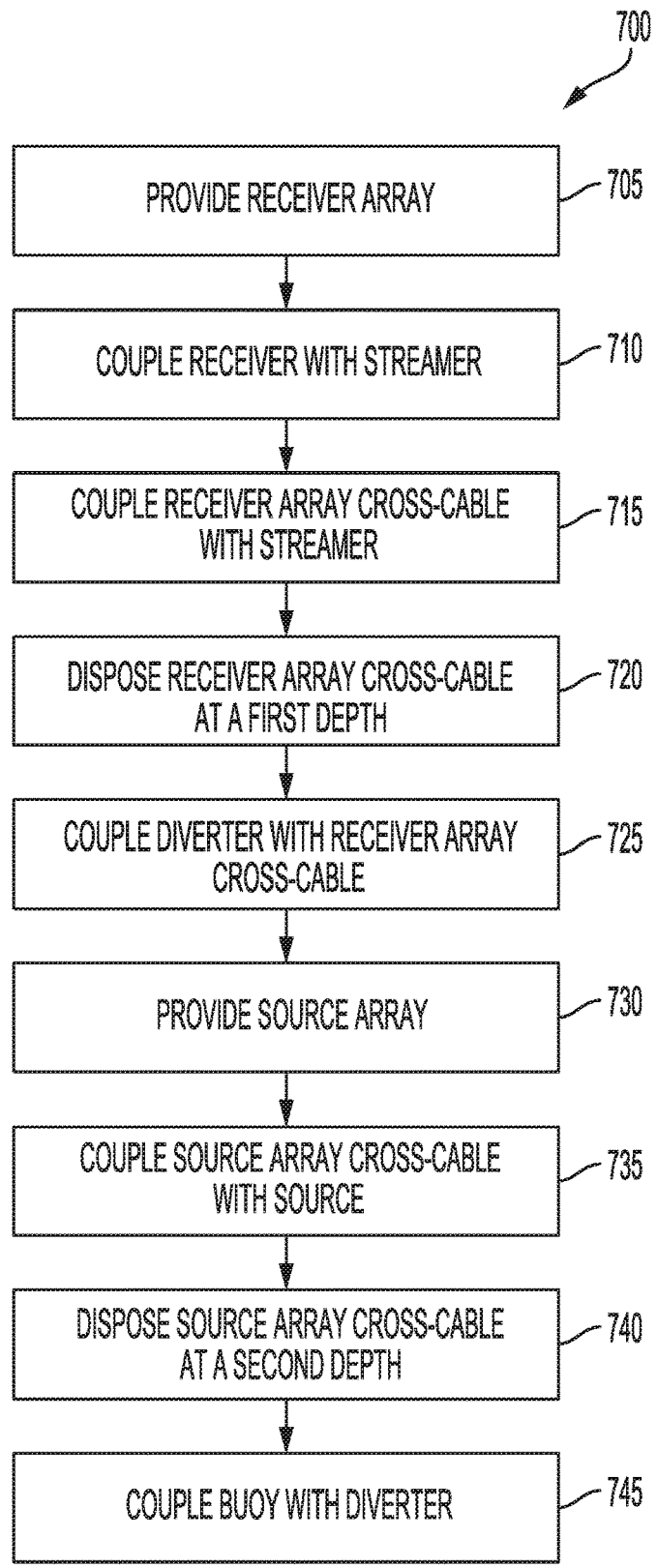
FIG. 7 illustrates a method of seabed object detection according to an example implementation.

FIG. 7 illustrates a method of seabed object detection according to an embodiment. In brief summary, the method 700 can include providing a receiver array (BLOCK 705). The method 700 can include coupling a receiver with a streamer (BLOCK 710). The method 700 can include coupling a receiver array cross-cable with a streamer (BLOCK 715). The method 700 can include disposing the receiver array cross-cable at a first depth (BLOCK 720). The method 700 can include coupling a diverter with the receiver array cross-cable (BLOCK 725). The method 700 can include providing a source array (BLOCK 730). The method 700 can include coupling a source array cross-cable with a source (BLOCK 735). The method 700 can include disposing the source array cross-cable at a second depth (BLOCK 740). The method 700 can include coupling a buoy with a diverter (BLOCK 745).

The method 700 can include providing a receiver array (BLOCK 705). The method can include providing the receiver array 105. The receiver array 105 can include a first streamer 125. The receiver array 105 can include a second streamer 130. The method can include providing a plurality of streamers 115. The plurality of streamers 115 can include the first streamer 125. The plurality of streamers 115 can include the second streamer 130. The plurality of streamers 115 can include exactly eight streamers. The method can include providing a first end streamer 335 of the plurality of streamers 115. The method can include disposing the first end streamer 335 at the first end of the receiver array 340. The method can include providing a second end streamer 355 of the plurality of streamers 115. The method can include disposing the second end streamer 355 at the second end of the receiver array 360. The second end of the receiver array 360 can be a distance less than 100 meters from the first end of the receiver array 340. The method can include towing, by a vessel 102, the receiver array 105 in a tow direction 101. The method can include receiving, by the receiver array 105, diffraction data that includes diffracted waves originating from a seabed object and generated from a source shot 215.

The method 700 can include coupling a receiver with a streamer (BLOCK 710). The method can include coupling the first plurality of receivers 110 with the first streamer 125. The method can include coupling the first plurality of receivers 110 with the second streamer 130. The method can include coupling the first plurality of receivers 110 with the third streamer 135. The method can include coupling the first plurality of receivers 110 with the fourth streamer 140. The method can include coupling the second plurality of receivers 120 with the first streamer 125. The method can include coupling the second plurality of receivers 120 with the second streamer 130. The method can include coupling the second plurality of receivers 120 with the third streamer 135. The method can include coupling the second plurality of receivers 120 with the fourth streamer 140.

The method 700 can include coupling a receiver array cross-cable with a streamer (BLOCK 715). The method can include coupling the receiver array cross-cable 195 with the first streamer 125. The method can include coupling the receiver array cross-cable 195 with the second streamer 130. The method can include towing, by a vessel 102, source array cross-cable 197 behind the receiver array cross-cable 195 relative to the tow direction 101.

The method 700 can include disposing the receiver array cross-cable at a first depth (BLOCK 720). The method can include disposing the receiver array cross-cable 195 at a first depth 375 of the body of water. The method can include disposing the receiver array cross-cable 195 at the first depth 375 greater than six meters below the sea surface 395.

The method 700 can include coupling a diverter with the receiver array cross-cable (BLOCK 725). The method can include coupling the first diverter 170 with the receiver array cross-cable 195. The method can include coupling the second diverter 175 with the receiver array cross-cable 195. The method can include coupling a first depth controller 385 with the first diverter 170. The method can include coupling a second depth controller 390 with the second diverter 175. The second depth controller 390 and the first depth controller 385 can maintain a depth of the receiver array 105.

The method 700 can include providing a source array (BLOCK 730). The method can include providing the source array 127. The source array 127 can include the first source 150. The source array 127 can include the second source 155. The source array 127 can be coplanar to the receiver array 105. The method can include providing a plurality of sources. The method can include providing a plurality of sources of the source array 127. The plurality of sources can include the first source 150. The plurality of sources can include the second source 155. The plurality of sources can include the third source 160. The plurality of sources can include the fourth source 165. The plurality of sources can include exactly eight sources. The method can include providing the first end source 345 of the plurality of sources. The method can include disposing the first end source 345 at the first end of the source array 350. The method can include providing the second end source 365 of the plurality of sources. The method can include disposing the second end source 365 at the second end of the source array 370. The second end source of the source array 370 can be a distance less than 100 meters from the first end of the source array 350. The method can include towing, by a vessel 102, the source array 127 in a tow direction 101.

The method 700 can include coupling a source array cross-cable with a source (BLOCK 735). The method can include can include coupling the source array cross-cable 197 with the first source 150. The method can include coupling the source array cross-cable 197 with the second source 155. The method can include towing, by a vessel 102, source array cross-cable 197 ahead of the receiver array cross-cable 195 relative to the tow direction 101.

The method 700 can include disposing the source array cross-cable at a second depth (BLOCK 740). The method can include disposing the source array cross-cable 197 at the second depth 380. The method can include disposing the source array cross-cable 197 at the second depth 380 greater than four meters below the sea surface 395.

The method 700 can include coupling a buoy with a diverter (BLOCK 745). The method can include coupling the first buoy 315 with the first diverter 170. The method can include coupling the second buoy 325 with the second diverter 175. The method can include coupling the first rod 320 with the first buoy 315. The method can include coupling the first rod 320 with the first diverter 170. The first rod 320 can separate the first buoy 315 from the first diverter 170. The method can include coupling the second rod 330 with the second buoy 325. The method can include coupling the second rod 330 with the second diverter 175. The second rod 330 can separate the second buoy 325 from the second diverter 175.

Figure 8:
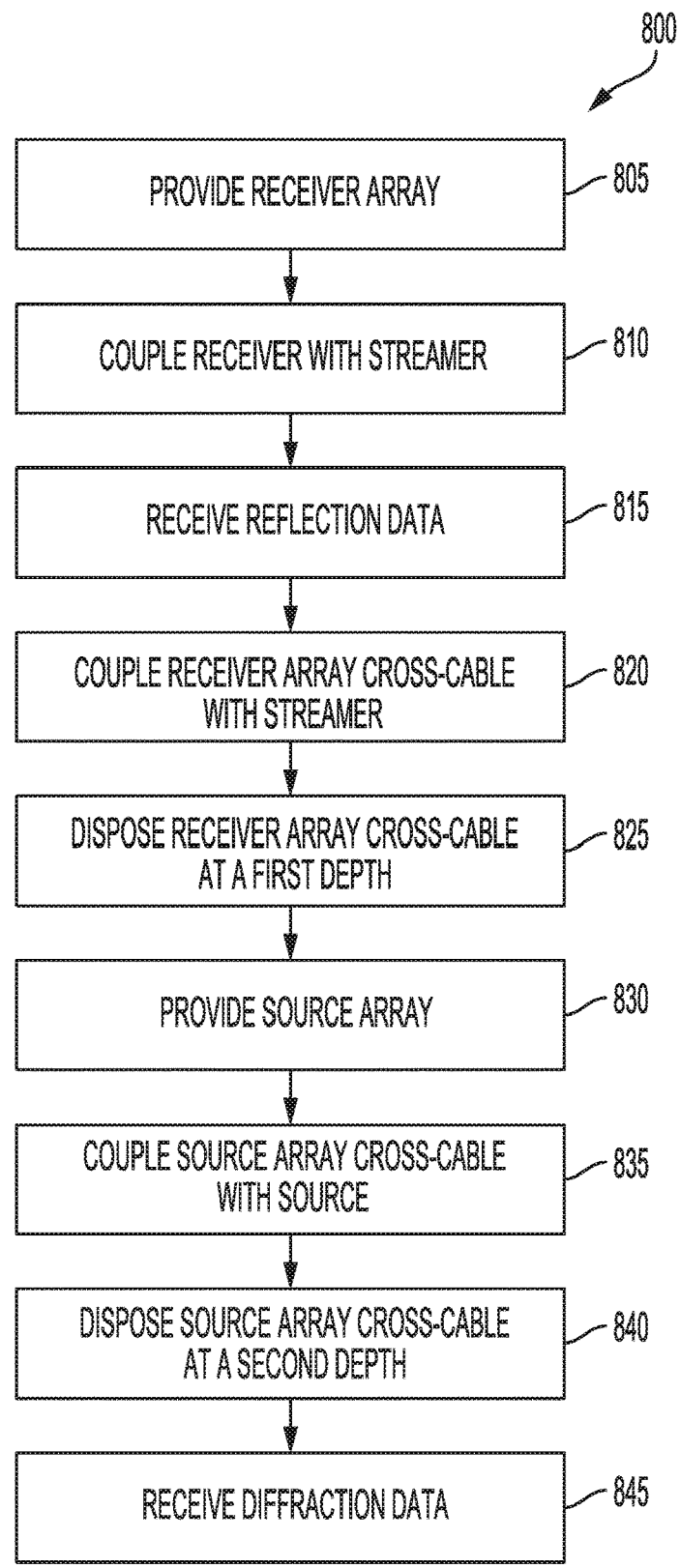
FIG. 8 illustrates a method of seabed object detection according to an example implementation.

FIG. 8 illustrates a method of seabed object detection according to an embodiment. In brief summary, the method 800 can include providing a receiver array (BLOCK 805). The method 800 can include coupling a receiver with a streamer (BLOCK 810). The method 800 can include receiving reflection data (BLOCK 815). The method 800 can include coupling a receiver array cross-cable with a streamer (BLOCK 820). The method 800 can include disposing the receiver array cross-cable at a first depth (BLOCK 825). The method 800 can include providing a source array (BLOCK 830). The method 800 can include coupling a source array cross-cable with a source (BLOCK 835). The method 800 can include disposing the source array cross-cable at a second depth (BLOCK 840). The method 800 can include receiving diffraction data (BLOCK 845).

The method 800 can include providing a receiver array (BLOCK 805). The method can include providing the receiver array 105. The receiver array 105 can include a first streamer 125. The receiver array 105 can include a second streamer 130. The method can include providing a plurality of streamers 115. The plurality of streamers 115 can include the first streamer 125. The plurality of streamers 115 can include the second streamer 130. The plurality of streamers 115 can include exactly eight streamers. The method can include providing a first end streamer 335 of the plurality of streamers 115. The method can include disposing the first end streamer 335 at the first end of the receiver array 340. The method can include providing a second end streamer 355 of the plurality of streamers 115. The method can include disposing the second end streamer 355 at the second end of the receiver array 360. The second end of the receiver array 360 can be a distance less than 100 meters from the first end of the receiver array 340. The method can include towing, by a vessel 102, the receiver array 105 in a tow direction 101. The method can include receiving, by the receiver array 105, diffraction data that includes diffracted waves originating from a seabed object and generated from a source shot 215.

The method 800 can include coupling a receiver with a streamer (BLOCK 810). The method can include coupling the first plurality of receivers 110 with the first streamer 125. The method can include coupling the first plurality of receivers 110 with the second streamer 130. The method can include coupling the first plurality of receivers 110 with the third streamer 135. The method can include coupling the first plurality of receivers 110 with the fourth streamer 140. The method can include coupling the second plurality of receivers 120 with the first streamer 125. The method can include coupling the second plurality of receivers 120 with the second streamer 130. The method can include coupling the second plurality of receivers 120 with the third streamer 135. The method can include coupling the second plurality of receivers 120 with the fourth streamer 140.

The method 800 can include receiving reflection data (BLOCK 815). The method can include receiving, by the first plurality of receivers, reflection data. The method can include receiving, by the first plurality of receivers, reflection data reflected off an object in a seabed. The method can include receiving, by the second plurality of receivers, reflection data. The method can include receiving, by the second plurality of receivers, reflection data reflected off an object in a seabed. The method can include receiving, by the at least one receiver of the first plurality of receivers 110, reflection data reflected off an object in a seabed during a first time period 605. The method can include receiving, by the at least one receiver of the first plurality of receivers 110, reflection data reflected off an ocean surface 395 and the object in the seabed 220 during a second time period 615. The first time period 605 can be separated from the second time period 615 by a first intervening time period 610. The method can include receiving, by the at least one receiver of the first plurality of receivers 110, reflection data reflected off the object in the seabed 220 and reflected off the ocean surface 395 during a third time period 620. The third time period can be separated from the first time period 605 by a second intervening time period 625. The method can include receiving, by the at least one receiver of the first plurality of receivers 110, reflection data reflected twice off the ocean surface 395 and reflected off the object in the seabed 220 during a fourth time period 630. The fourth time period 630 can be separated from the first time period 605 by a third intervening time period 635.

The method can include receiving, by the at least one receiver of the second plurality of receivers 120, reflection data reflected off an object in a seabed during a first time period 605. The method can include receiving, by the at least one receiver of the second plurality of receivers 120, reflection data reflected off the ocean surface 395 and the object in the seabed 220 during a second time period 615. The first time period 605 can be separated from the second time period 615 by a first intervening time period 610. The method can include receiving, by the at least one receiver of the second plurality of receivers 120, reflection data reflected off the object in the seabed 220 seabed and reflected off the ocean surface 395 during a third time period 620. The third time period 620 can be separated from the first time period 605 by a second intervening time period 625. The method can include receiving, by the at least one receiver of the second plurality of receivers 120, reflection data reflected twice off the ocean surface 395 and off the object in the seabed 220 during a fourth time period 630. The fourth time period 630 can be separated from the first time period 605 by a third intervening time period 635

The method 800 can include coupling a receiver array cross-cable with a streamer (BLOCK 820). The method can include coupling the receiver array cross-cable 195 with the first streamer 125. The method can include coupling the receiver array cross-cable 195 with the second streamer 130. The method can include towing, by a vessel 102, source array cross-cable 197 behind the receiver array cross-cable 195 relative to the tow direction 101.

The method 800 can include disposing the receiver array cross-cable at a first depth (BLOCK 825). The method can include disposing the receiver array cross-cable 195 at a first depth 375 of the body of water. The method can include disposing the receiver array cross-cable 195 at the first depth 375 greater than six meters below the sea surface 395.

The method 800 can include providing a source array (BLOCK 830). The method can include providing the source array 127. The source array 127 can include the first source 150. The source array 127 can include the second source 155. The source array 127 can be coplanar to the receiver array 105. The method can include providing a plurality of sources. The method can include providing a plurality of sources of the source array 127. The plurality of sources can include the first source 150. The plurality of sources can include the second source 155. The plurality of sources can include the third source 160. The plurality of sources can include the fourth source 165. The plurality of sources can include exactly eight sources. The method can include providing the first end source 345 of the plurality of sources. The method can include disposing the first end source 345 at the first end of the source array 350. The method can include providing the second end source 365 of the plurality of sources. The method can include disposing the second end source 365 at the second end of the source array 370. The second end source of the source array 370 can be a distance less than 100 meters from the first end of the source array 350. The method can include towing, by a vessel 102, the source array 127 in a tow direction 101. The method can include coupling the source array cross-cable 197 with the first source 150. The method can include coupling the source array cross-cable 197 with the second source 155. The method can include towing, by a vessel 102, source array cross-cable 197 ahead of the receiver array cross-cable 195 relative to the tow direction 101.

The method 800 can include coupling a source array cross-cable with a source (BLOCK 835). The method can include can include coupling the source array cross-cable 197 with the first source 150. The method can include coupling the source array cross-cable 197 with the second source 155. The method can include towing, by a vessel 102, source array cross-cable 197 ahead of the receiver array cross-cable 195 relative to the tow direction 101.

The method 800 can include disposing the source array cross-cable at a second depth (BLOCK 840). The method can include disposing the source array cross-cable 197 at the second depth 380. The method can include disposing the source array cross-cable 197 at the second depth 380 greater than four meters below the sea surface 395.

The method 800 can include receiving diffraction data (BLOCK 845). The method can include receiving, by the first plurality of receivers 110, diffraction data. The method can include receiving, by the first plurality of receivers 110, diffraction data diffracted off an object in a seabed. The method can include receiving, by the second plurality of receivers 120, diffraction data. The method can include receiving, by the second plurality of receivers 120, diffraction data diffracted off an object in a seabed.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seabed object detection system, comprising:
   a receiver array comprising a first streamer;
   a first plurality of receivers coupled with the first streamer;
   at least one receiver of the first plurality of receivers to receive reflection data reflected off an object in a seabed during a first time period and to receive reflection data reflected off an ocean surface and the object in the seabed during a second time period, the first time period separated from the second time period by a first intervening time period, wherein the at least one receiver of the first plurality of receivers receives diffraction data that includes diffracted waves originating from the object in the seabed and generated from a source shot;
   a receiver array cross-cable to couple with the first streamer, the receiver array cross-cable disposed at a first depth of a body of water;
   a source array comprising a first source; and
   a source array cross-cable to couple with the first source, the source array cross-cable disposed at a second depth of the body of water.

2. The seabed object detection system of claim 1, comprising:
   the at least one receiver of the first plurality of receivers to receive reflection data reflected off the object in the seabed and reflected off the ocean surface during a third time period, the third time period separated from the first time period by a second intervening time period.

3. The seabed object detection system of claim 1, comprising:
   the at least one receiver of the first plurality of receivers to receive reflection data reflected twice off the ocean surface and off the object in the seabed during a fourth time period, the fourth time period separated from the first time period by a third intervening time period.

4. The seabed object detection system of claim 1, comprising:
   the receiver array comprising a second streamer;
   a second plurality of receivers coupled with the second streamer; and
   at least one receiver of the second plurality of receivers to receive reflection data reflected off the object in the seabed during the first time period and to receive reflection data reflected off the ocean surface and the object in the seabed during the second time period, the first time period separated from the second time period by the first intervening time period.

5. The seabed object detection system of claim 1, comprising:
   the receiver array comprising a second streamer;
   a second plurality of receivers coupled with the second streamer; and
   the at least one receiver of the second plurality of receivers to receive reflection data reflected off the object in the seabed and reflected off the ocean surface during a third time period, the third time period separated from the first time period by a second intervening time period.

6. The seabed object detection system of claim 1, comprising:
   the receiver array comprising a second streamer;
   a second plurality of receivers coupled with the second streamer; and
   the at least one receiver of the second plurality of receivers to receive reflection data reflected twice off the ocean surface and off the object in the seabed during a fourth time period, the fourth time period separated from the first time period by a third intervening time period.

7. The seabed object detection system of claim 1, comprising:
   the first intervening time period at least 5 milliseconds.

8. The seabed object detection system of claim 1, comprising:
   the source array coplanar to the receiver array.

9. The seabed object detection system of claim 1, comprising:
   a vessel configured to tow the receiver array and the source array.

10. A method of seabed object detection, comprising:
    providing a receiver array comprising a first streamer;
    coupling a first plurality of receivers with the first streamer;
    receiving, by at least one receiver of the first plurality of receivers, reflection data reflected off an object in a seabed during a first time period and to receive reflection data reflected off an ocean surface and the object in the seabed during a second time period, the first time period separated from the second time period by a first intervening time period, wherein the at least one receiver of the first plurality of receivers receives diffraction data that includes diffracted waves originating from the object in the seabed and generated from a source shot;
    coupling a receiver array cross-cable with the first streamer;
    disposing the receiver array cross-cable a first depth of a body of water;
    providing a source array comprising a first source;
    coupling a source array cross-cable with the first source;
    disposing the source array cross-cable at a second depth of the body of water.

11. The method of claim 10, comprising:
    receiving, by the at least one receiver of the first plurality of receivers, reflection data reflected off the object in the seabed and reflected off the ocean surface during a third time period, the third time period separated from the first time period by a second intervening time period.

12. The method of claim 10, comprising:
    receiving, by the at least one receiver of the first plurality of receivers, reflection data reflected twice off the ocean surface and off the object in the seabed during a fourth time period, the fourth time period separated from the first time period by a third intervening time period.

13. The method of claim 10, comprising:
providing the receiver array comprising a second streamer;
coupling a second plurality of receivers with the second streamer; and
receiving, by at least one receiver of the second plurality of receivers, reflection data reflected off the object in the seabed during the first time period and to receive reflection data reflected off the ocean surface and the object in the seabed during the second time period, the first time period separated from the second time period by the first intervening time period.

14. The method of claim 10, comprising:
providing the receiver array comprising a second streamer;
coupling a second plurality of receivers with the second streamer; and
receiving, by the at least one receiver of the second plurality of receiver, reflection data reflected off the object in the seabed and off the ocean surface during a third time period, the third time period separated from the first time period by a second intervening time period.

15. The method of claim 10, comprising:
providing the receiver array comprising a second streamer;
coupling a second plurality of receivers with the second streamer; and
receiving, by the at least one receiver of the second plurality of receiver, reflection data reflected twice off the ocean surface and off the object in the seabed during a fourth time period, the fourth time period separated from the first time period by a third intervening time period.

16. The method of claim 10, comprising:
providing the first intervening time period at least 5 milliseconds.

17. The method of claim 10, comprising:
providing the source array coplanar to the receiver array.

18. The method of claim 10, comprising:
towing, by a vessel, the receiver array and the source array.

* * * * *